July 24, 1962  R. S. RAE  3,045,596
GUIDED MISSILE
Filed Feb. 10, 1954  26 Sheets-Sheet 1

INVENTOR
RANDOLPH S. RAE
BY
ATTORNEYS

INVENTOR
RANDOLPH S. RAE

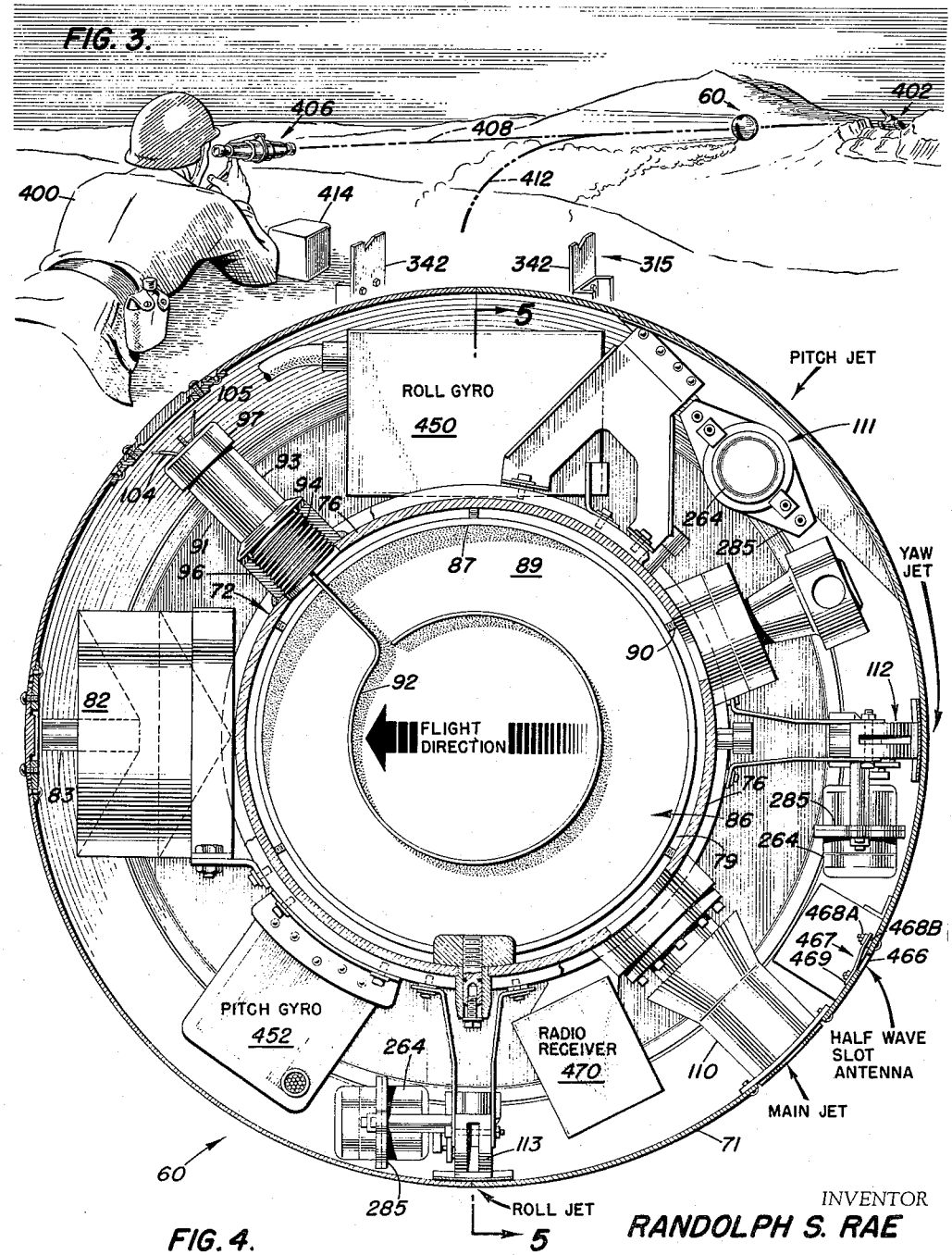

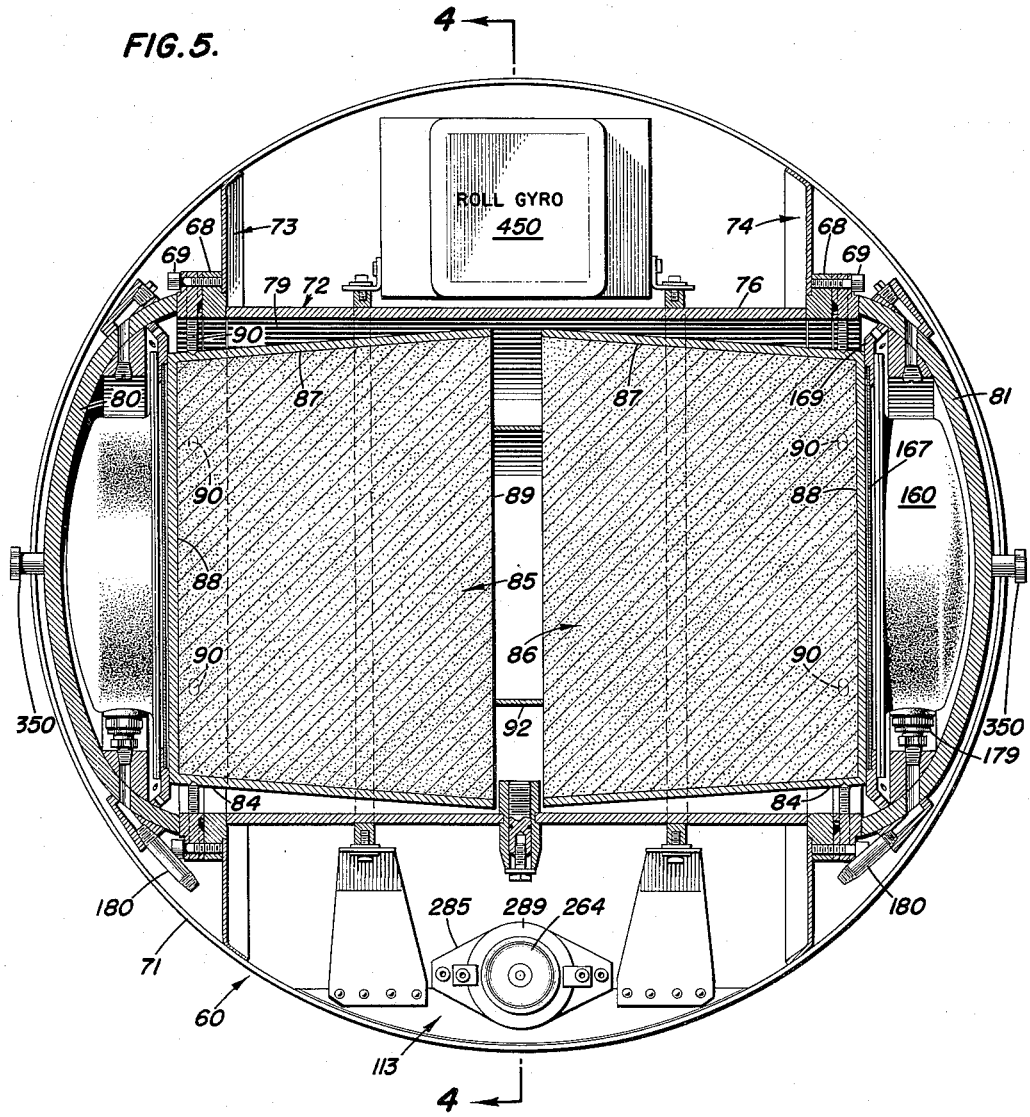

INVENTOR
*RANDOLPH S. RAE*

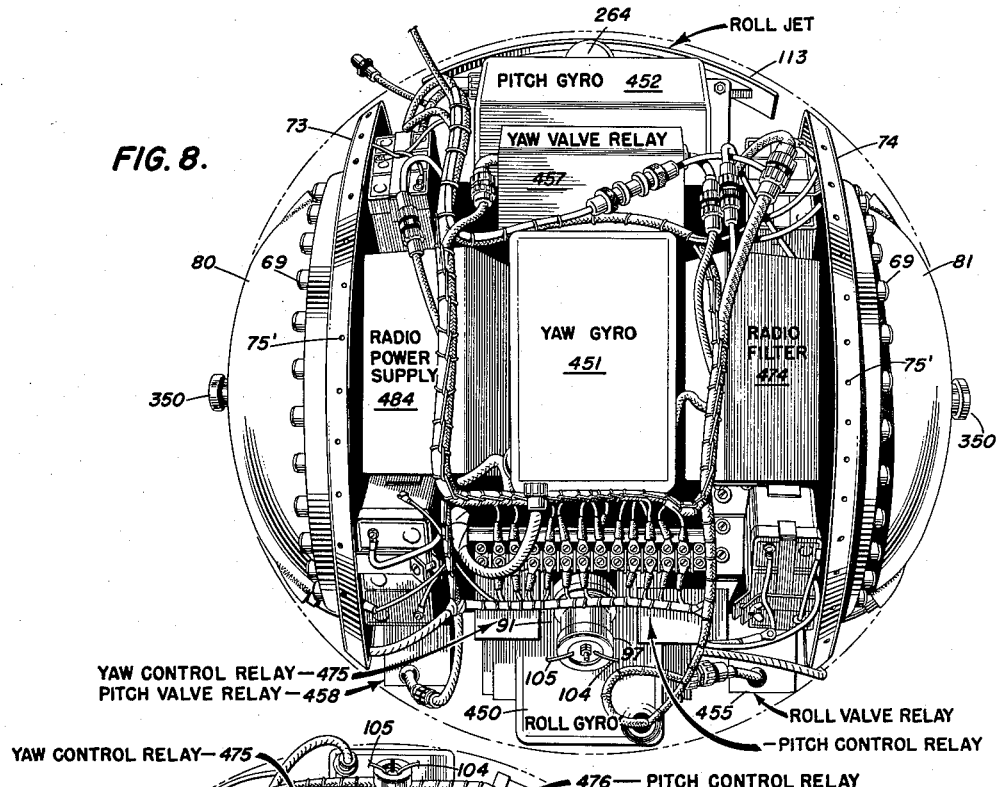
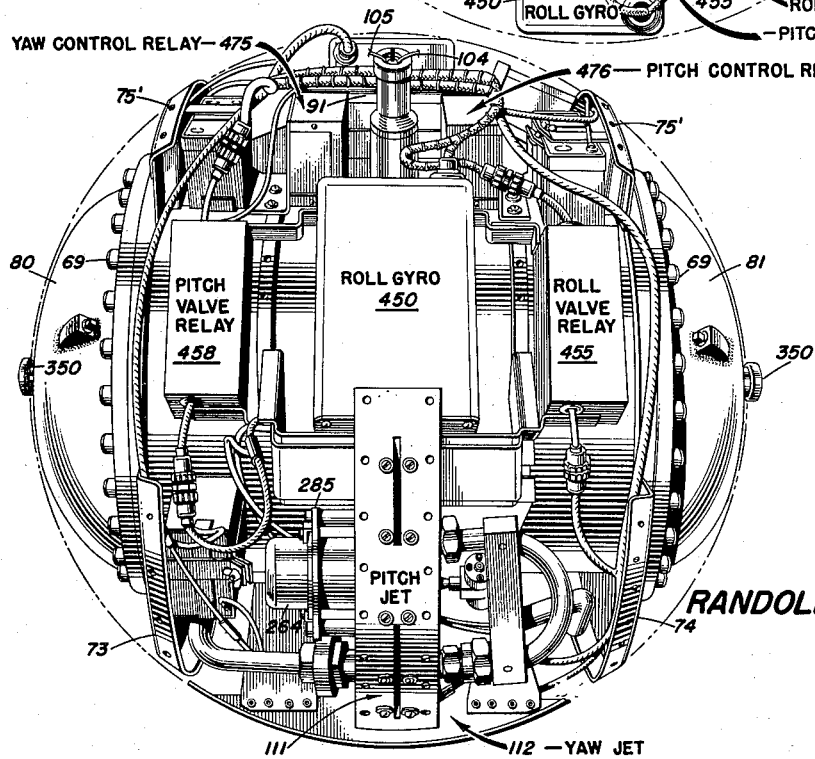

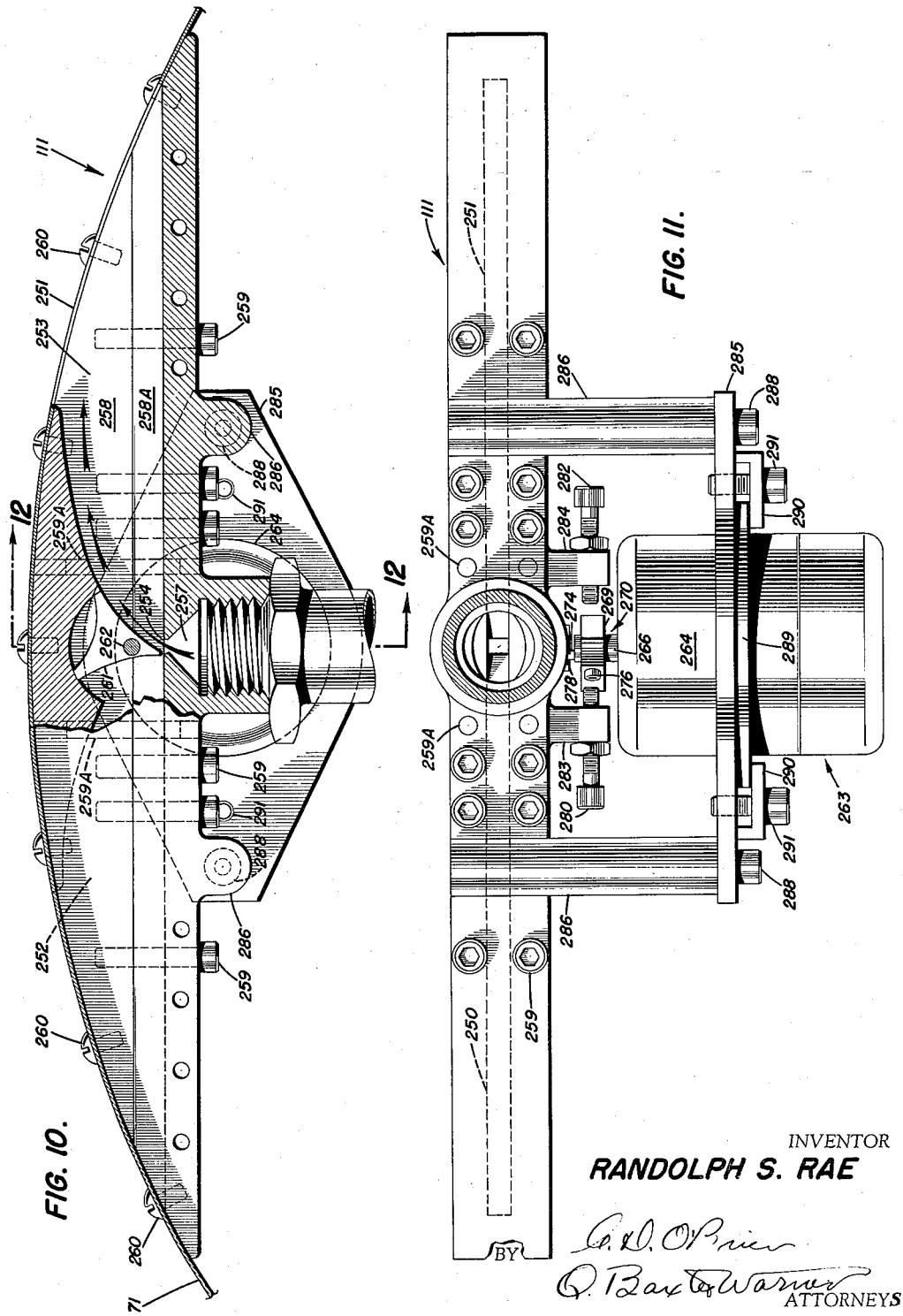

July 24, 1962
R. S. RAE
3,045,596
GUIDED MISSILE
Filed Feb. 10, 1954
26 Sheets-Sheet 8
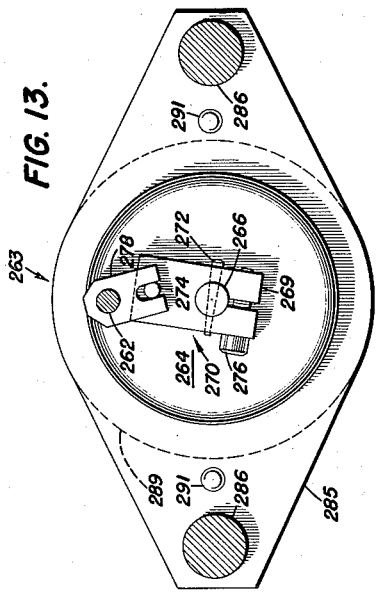
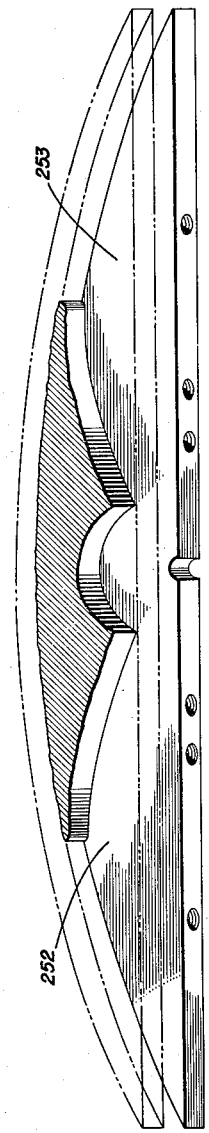
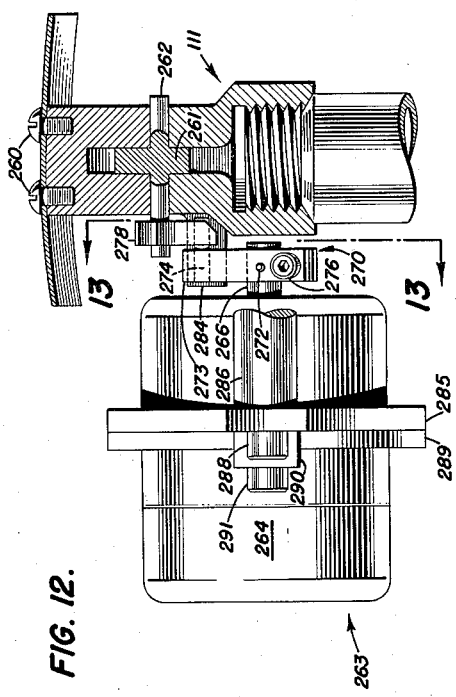
INVENTOR
RANDOLPH S. RAE
BY
ATTORNEYS July 24, 1962 R. S. RAE 3,045,596
GUIDED MISSILE
Filed Feb. 10, 1954 26 Sheets-Sheet 9

INVENTOR
RANDOLPH S. RAE

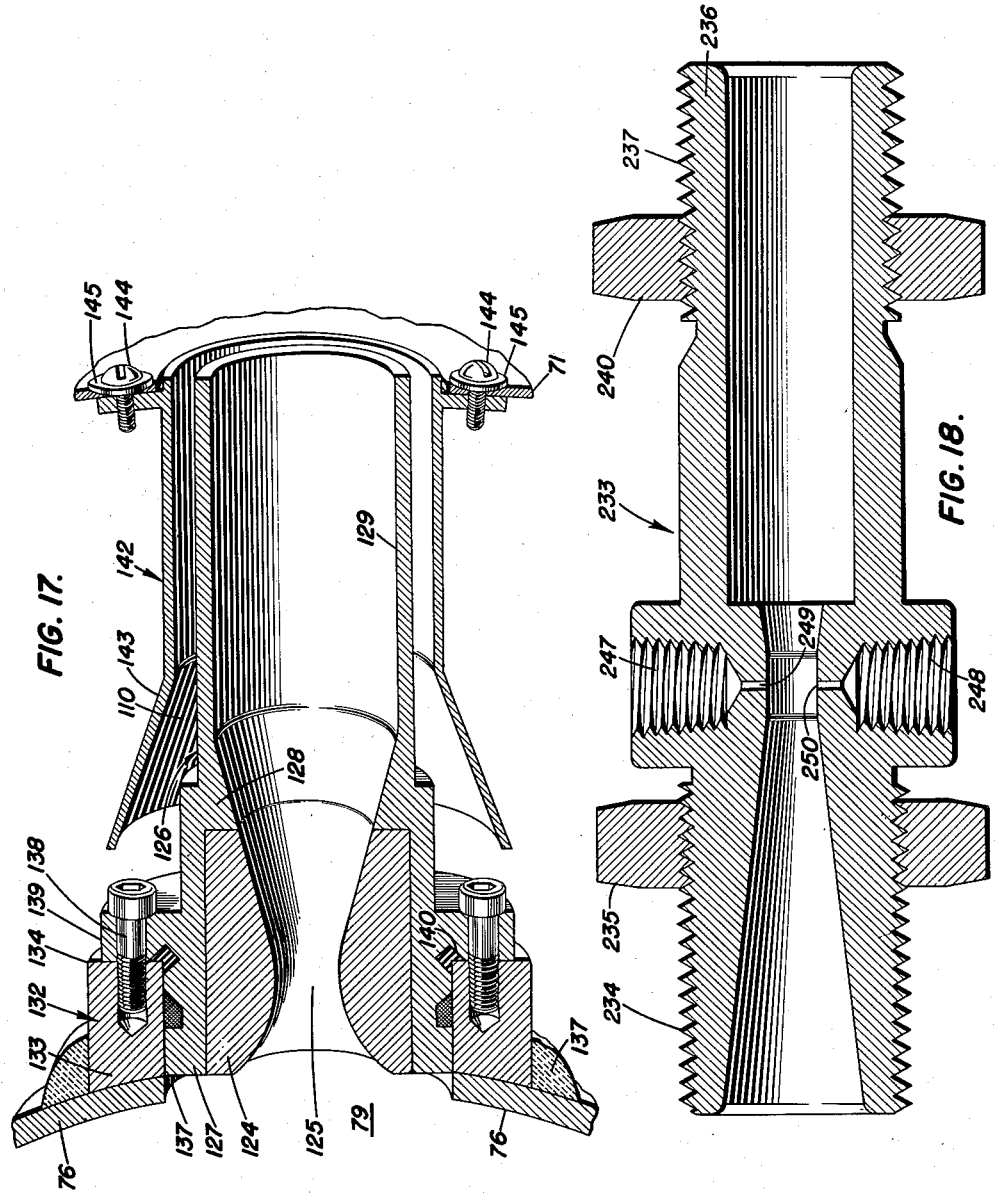

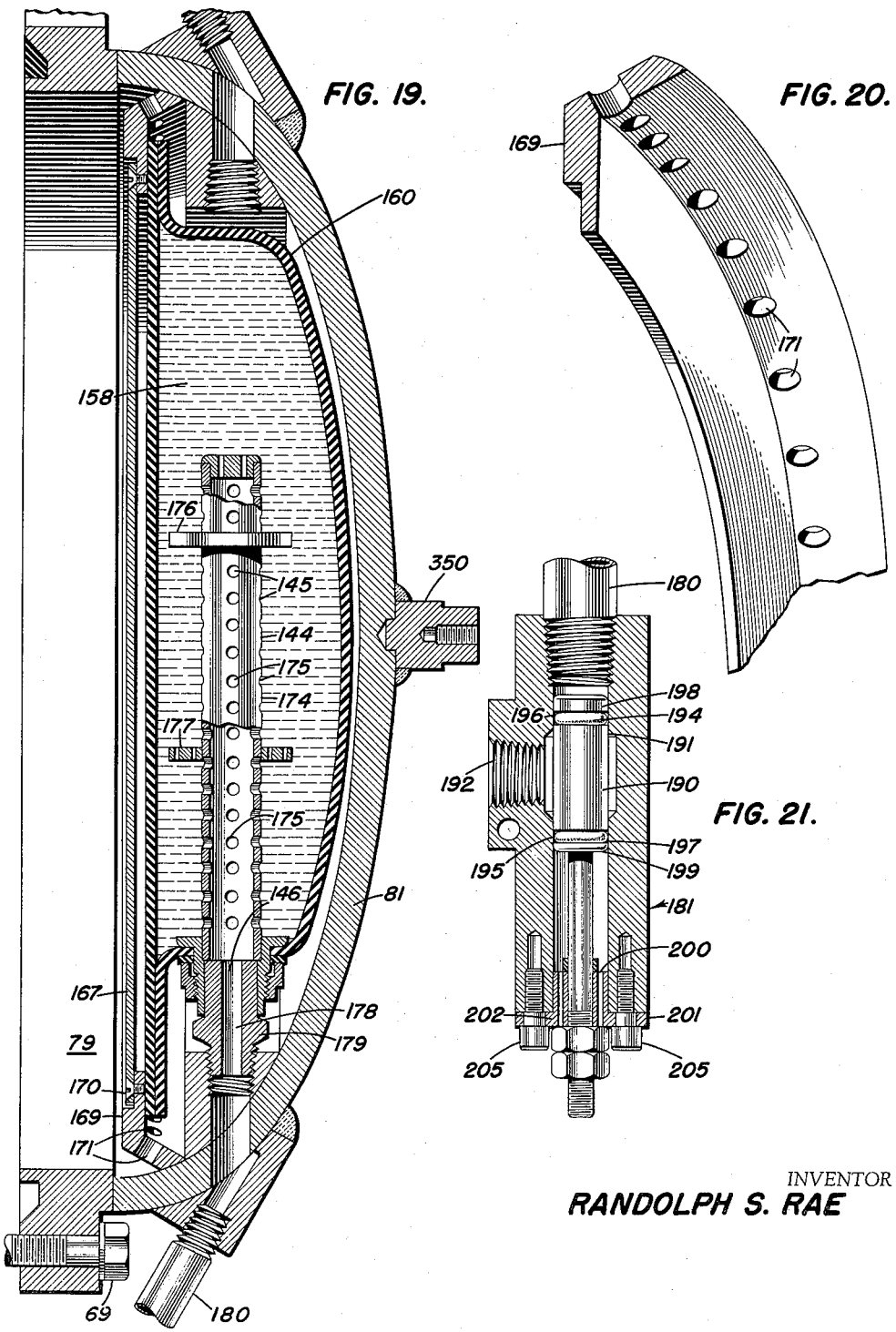

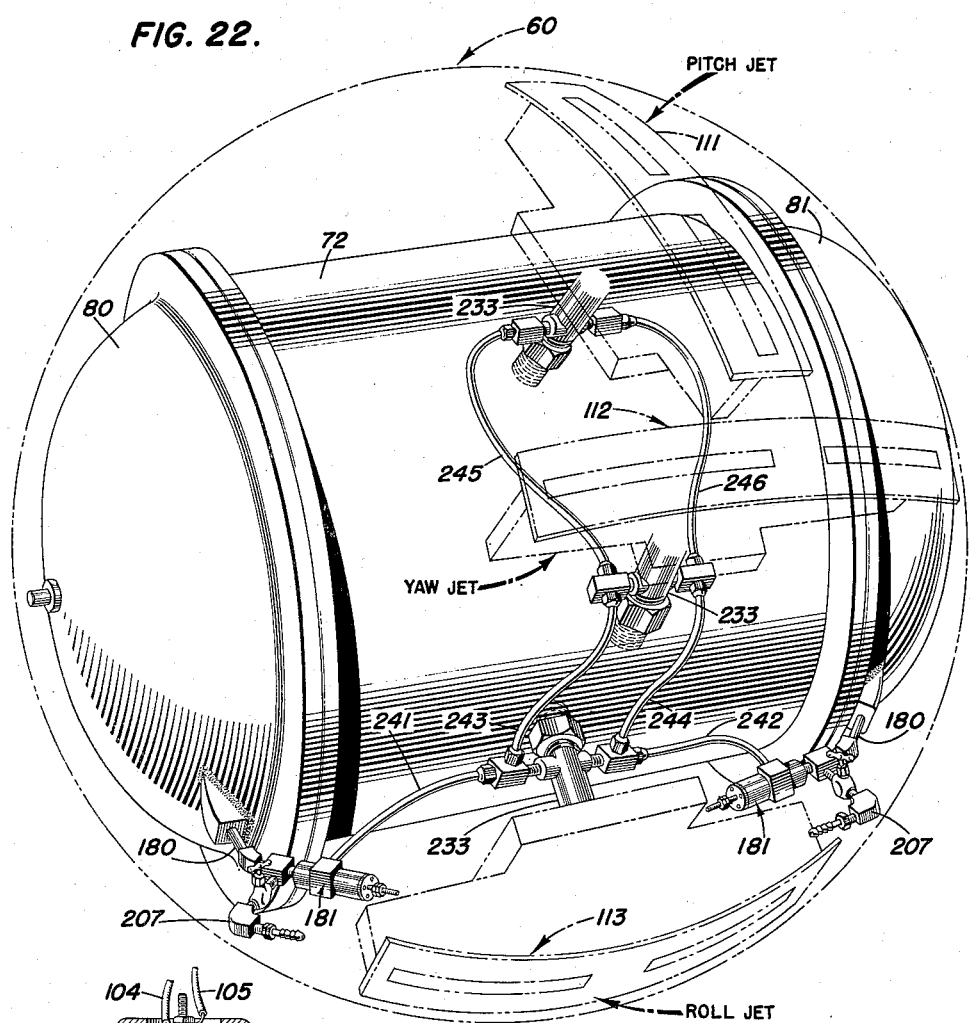
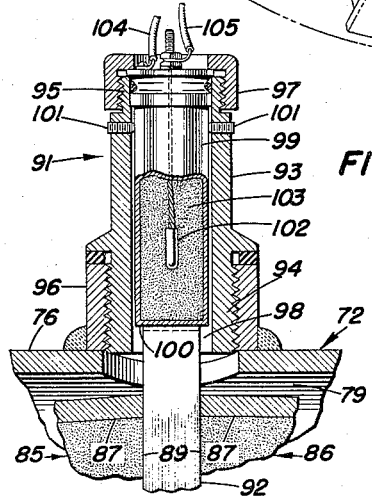
FIG. 22.
FIG. 23.
INVENTOR
RANDOLPH S. RAE

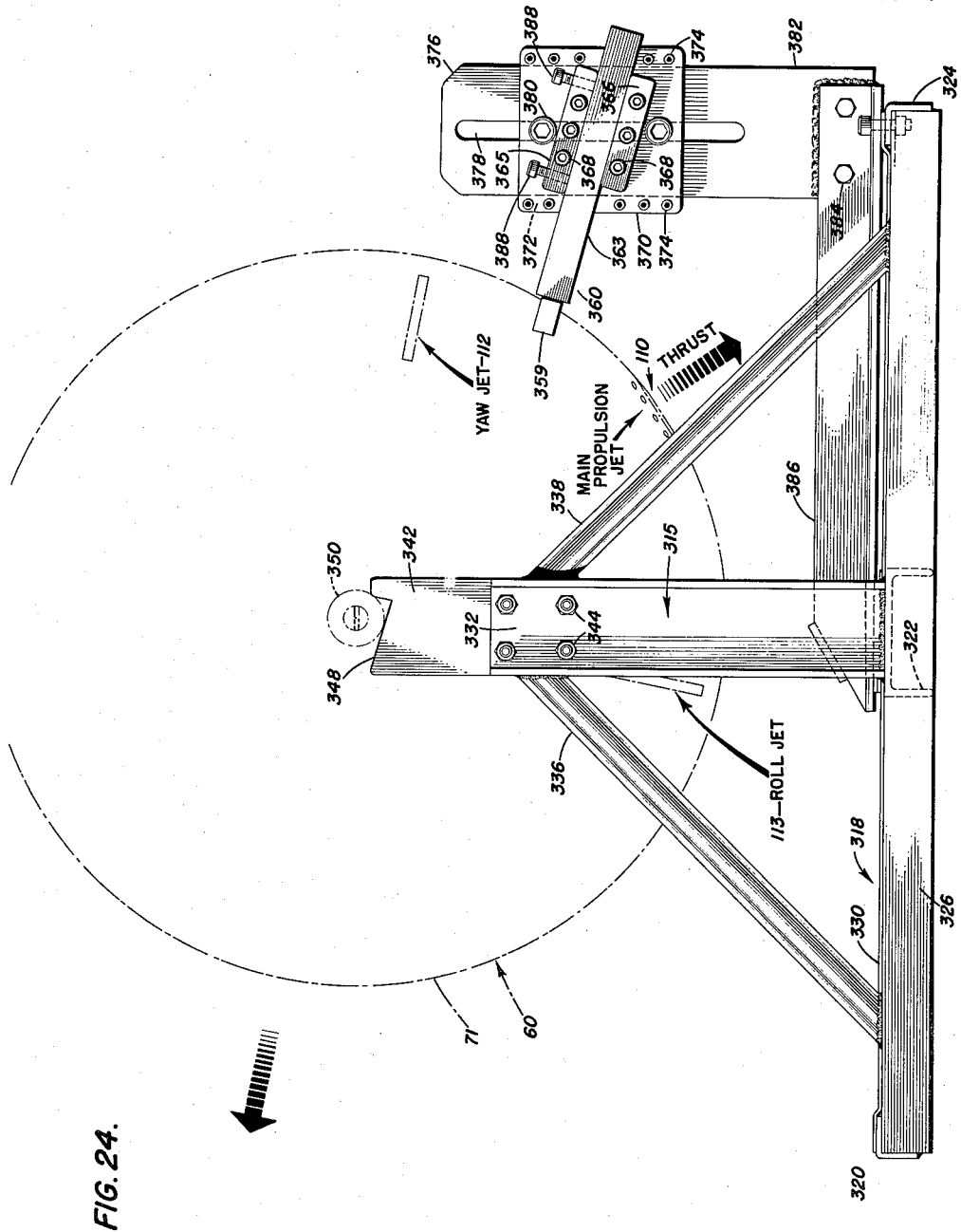

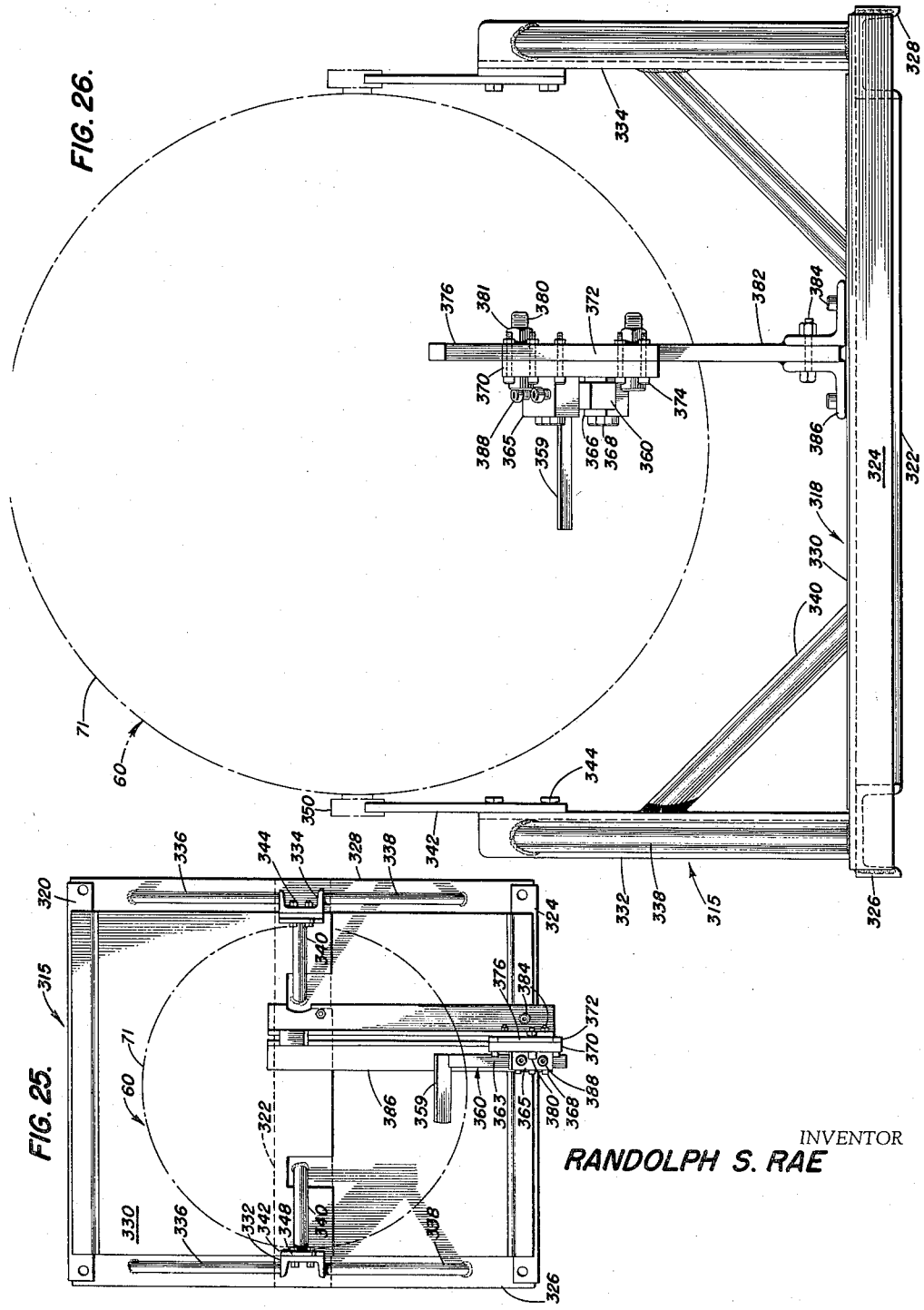

July 24, 1962
R. S. RAE
3,045,596
GUIDED MISSILE
Filed Feb. 10, 1954
26 Sheets-Sheet 16
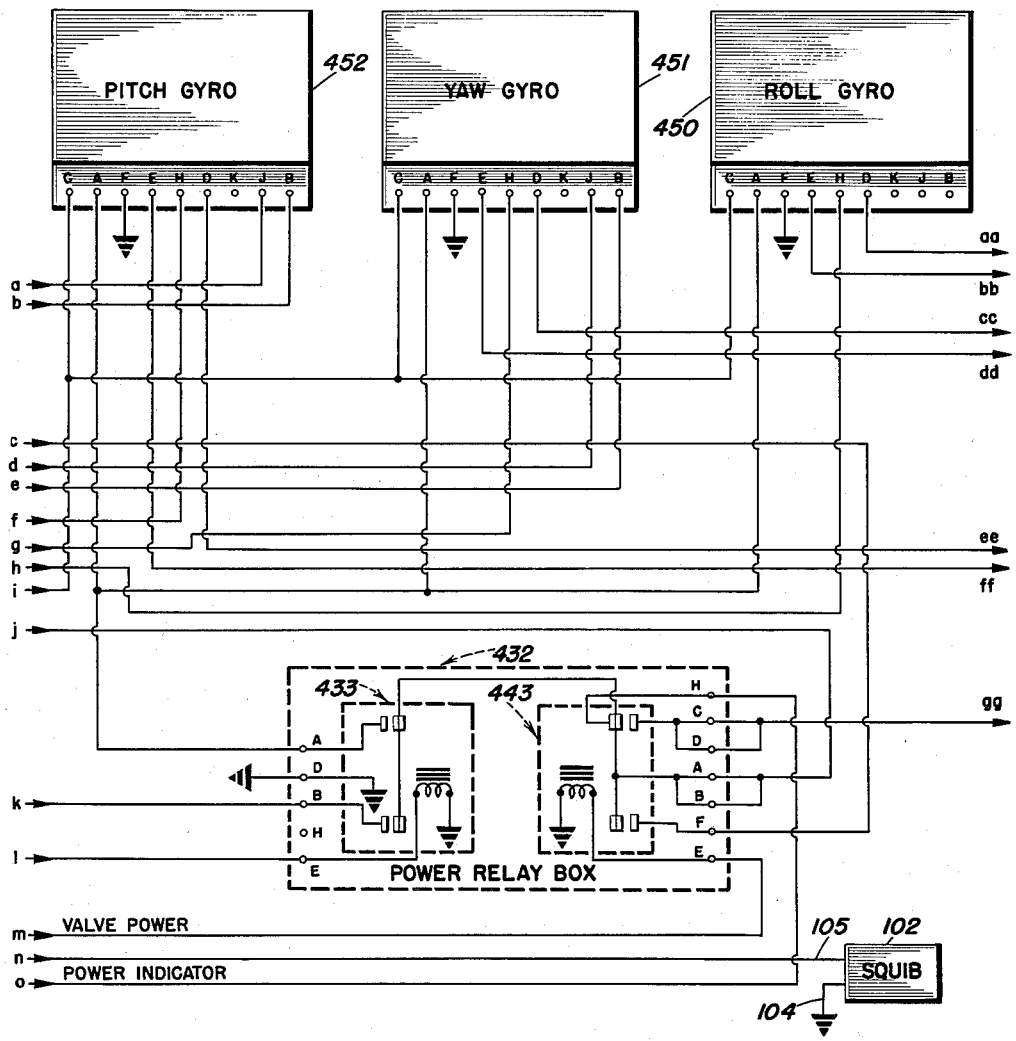
FIG. 28.
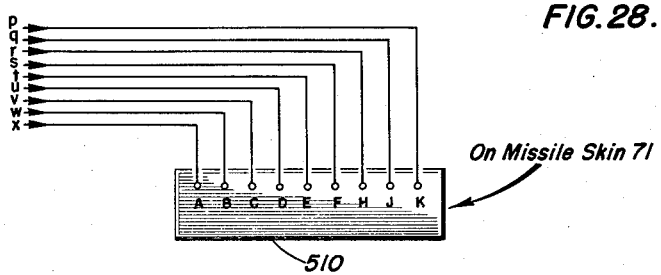
INVENTOR
RANDOLPH S. RAE July 24, 1962

R. S. RAE 3,045,596

GUIDED MISSILE

Filed Feb. 10, 1954

INVENTOR
RANDOLPH S. RAE

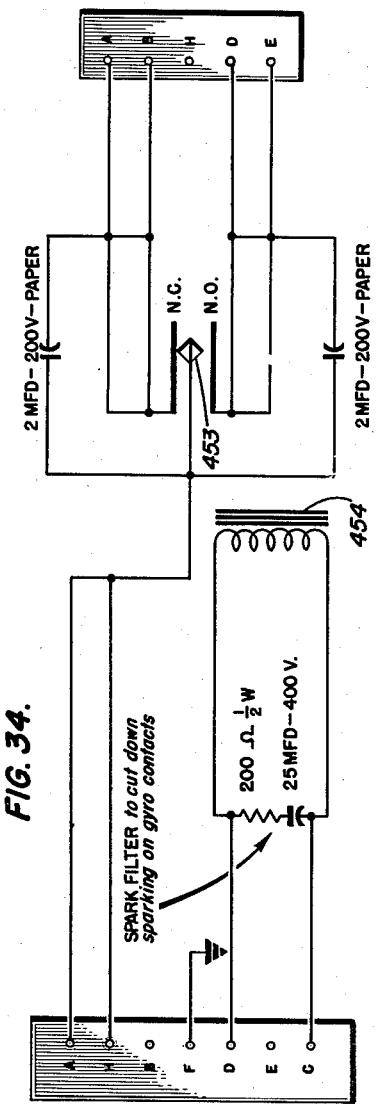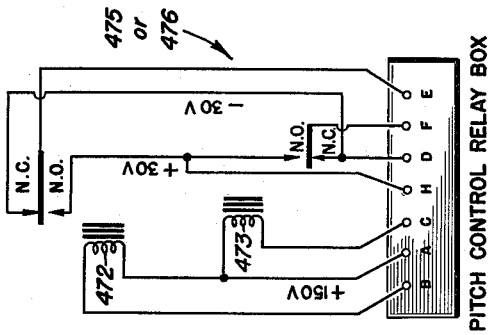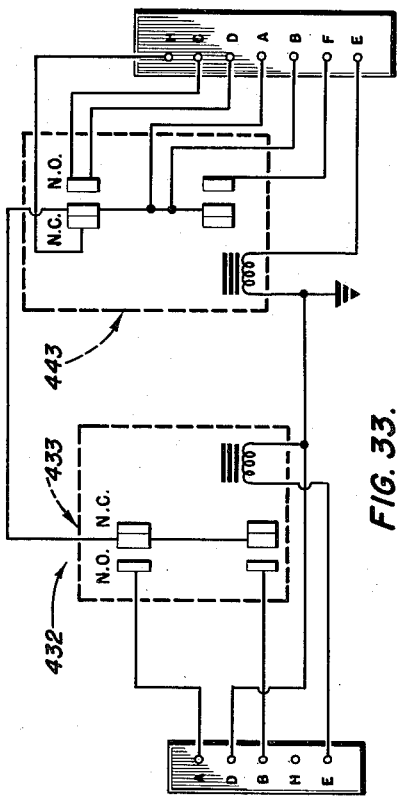

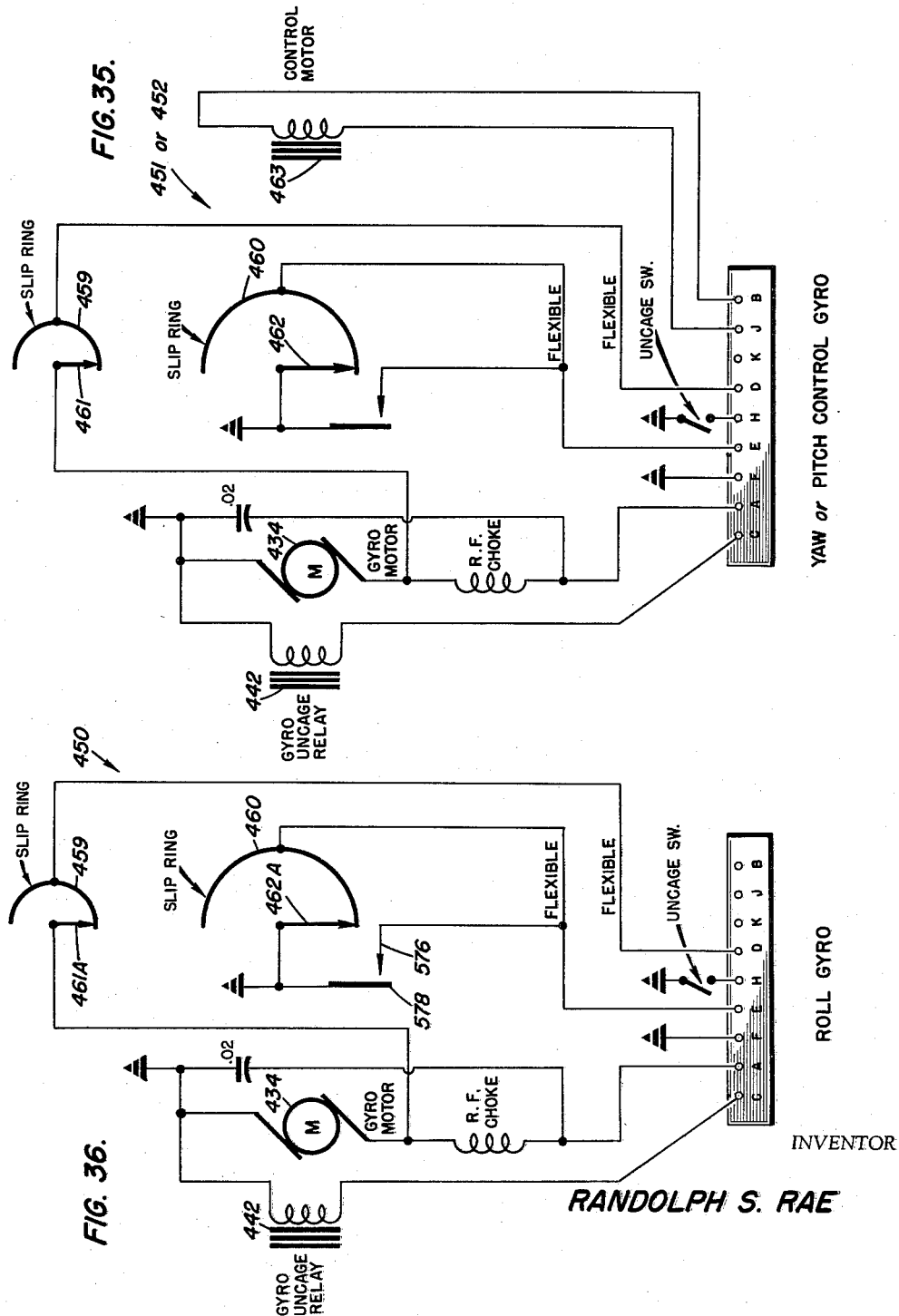

INVENTOR
RANDOLPH S. RAE

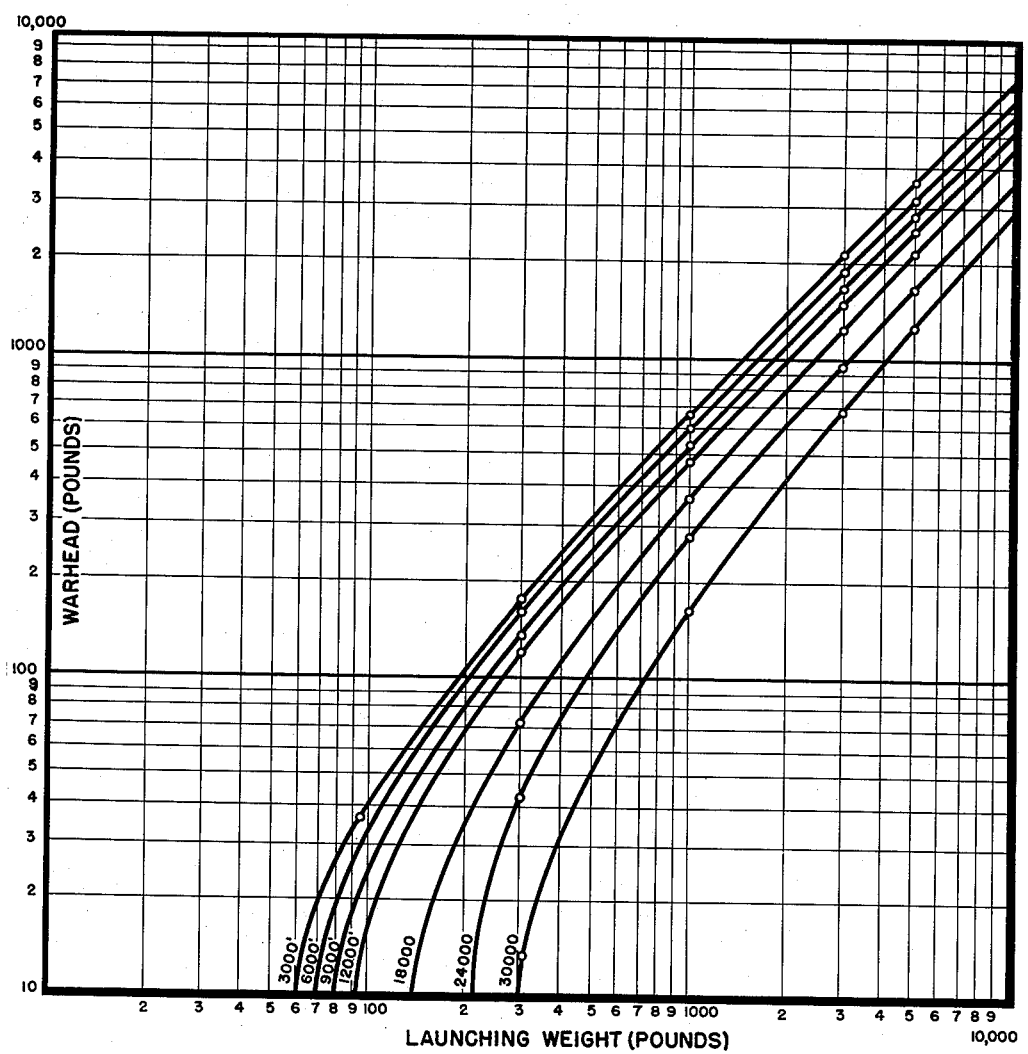

July 24, 1962  R. S. RAE  3,045,596
GUIDED MISSILE
Filed Feb. 10, 1954  26 Sheets-Sheet 24

INVENTOR
RANDOLPH S. RAE

INVENTOR
*RANDOLPH S. RAE*

July 24, 1962 R. S. RAE 3,045,596
GUIDED MISSILE
Filed Feb. 10, 1954 26 Sheets-Sheet 26

INVENTOR
RANDOLPH S. RAE

United States Patent Office 3,045,596
Patented July 24, 1962

3,045,596
GUIDED MISSILE
Randolph S. Rae, Los Angeles, Calif., assignor to the United States of America as represented by the Secretary of the Navy
Filed Feb. 10, 1954, Ser. No. 409,549
7 Claims. (Cl. 102—50)

This invention relates generally to guided missiles of the jet or reaction type. More particularly, the invention pertains to a subsonic, line-of-sight guided missile which is launched and controlled in aerial flight by an operator from the time of launching until the time of contact with a target, such as a tank, an armored vehicle, a field fortification, or an aerial vehicle.

It is frequently desirable to have a guided missile which can be launched from the ground with a minimum of launching equipment, and which will be propelled over relatively short distances of the magnitude of approximately 9,000 feet, for combat use against tanks, armored vehicles, gun emplacements, field fortifications, or against personnel at a limited distance from the launching position. In addition, for many tactical operations, it is desirable to have a subsonic, line-of-sight missile which is self-launching, and which is controlled over its period of flight by a guidance system under the operating command of the missile operator.

It is, therefore, an object of this invention to provide a visually-electronically controlled aerial missile in which lift, propulsion, and guidance are achieved by jet reaction, thus eliminating the necessity for lifting and control surfaces which produce aerodynamic torques and lift forces which are variable with speed.

Another object of the invention is to provide a subsonic line-of-sight guided missile in which guidance thereof is achieved by an operator who observes the missile and target continuously through an optical arrangement and who transmits correcting signals to apparatus located in the missile to bring the missile onto the line-of-sight and maintain it there throughout its flight to a target.

Even another object of this invention is to provide an aerial missile of the jet or reaction type wherein the orientation of the missile is stabilized and the missile is caused to maintain a constant heading in the absence of guidance signals.

Other objects of the invention are to provide a controllable guided missile of the jet or reaction type that is wholly supported and guided by the reaction of the gases liberated from a rocket motor in the missile and which is spherically shaped to make it aerodynamically neutral.

In the operation of certain types of guided missiles, it is customary to provide a continuous exhaust blast or flow of hot gases through a nozzle and to direct this blast in different directions in order to utilize the reaction forces generated to control the orientation of the missile. Considerable difficulty has been encountered in controlling the direction of flow of the exhaust gases from the nozzle, and the magnitude of the reaction or thrust forces so that the missile can be accurately guided.

Other objects of the invention, therefore, are to provide simple, quick-acting, and suitable pitch, roll, and yaw control valve arrangements for directing the flow of portions of the exhaust gases from these valve arrangements in order to control the direction as well as the magnitude of the thrust force developed by the escaping of another portion of the gases from the main propulsion nozzle of the rocket motor so that the aerial missile can be accurately and visually guided.

Still another object of the invention is to provide a unique military weapon which can be used effectively in combat for destroying tanks, armored vehicles, anti-personnel bombs, bombardment of field fortifications and naval vessels, laying down of successive concentrations of missile fire upon a suitable target, and which can be used for destroying aircraft and other aerial targets, such as kamikaze missiles.

Other objects and many of the attendant advantages of this invention will be apparent by reference to the following detailed description, taken in conjunction with the accompanying drawings, and in which:

FIG. 3 is a schematic showing tactical use of the missile against an armored vehicle, such as a tank;

FIG. 4 is a longitudinal section taken along line 4—4 of FIG. 5;

FIG. 5 is a transverse section taken along line 5—5 of FIG. 4;

FIG. 8 is a perspective view of the missile with the skin removed and the missile rotated again 90° from the bottom to center in that order from the position shown in FIG. 7;

FIG. 9 is a perspective view of the missile with the skin removed and the missile rotated again 90° from bottom to center in that order from the position shown in FIG. 8;

FIG. 10 is a front elevation of a control valve arrangement for the missile;

FIG. 11 is a plan of the control valve arrangement illustrated in FIG. 10, including the actuating motor for the valve arrangement;

FIG. 12 is a view, partially in section and partially in elevation, the portion in section being taken along line 12—12 of FIG. 10;

FIG. 13 is a cross section taken along line 13—13 of FIG. 12;

FIG. 14 is a perspective view of a detail of the control valve arrangement illustrated in FIG. 10;

FIG. 17 is a perspective view of the main propulsion jet nozzle and heat protecting shroud, with parts broken away, in section, to show internal shapes and constructions;

FIG. 18 is a longitudinal section of a second embodiment of the water cooler nozzle, such as illustrated in FIG. 15;

FIG. 19 is a transverse section of one end of the rocket motor showing the coolant container and its associated perforated outlet nozzle;

FIG. 20 is a perspective view of a portion of the perforated rim separating the coolant and the rocket motor chambers;

FIG. 21 is a longitudinal section of a coolant line valve showing the valve in a closed position;

FIG. 22 is a perspective view of the rocket motor and coolant chambers illustrating a modified form of the coolant piping system, with the various control valve arrangements and missile configuration being shown in dash-dot lines;

FIG. 23 is a longitudinal section of an igniter and a portion of the booster strip;

FIG. 24 is a side elevation of the missile launcher showing the missile in dash-dot lines in position to be launched;

FIG. 25 is a top plan view of the missile launcher on a reduced scale, showing the missile in dash-dot lines in its launching position;

FIG. 26 is a rear elevation of the missile launcher showing the missile in dash-dot lines;

FIG. 28 is a continuation of the missile circuitry shown in FIG. 27;

FIG. 32 is a schematic of the circuitry for the yaw or pitch control relay box;

FIG. 33 is a schematic of the circuitry for the power relay box;

FIG. 34 is a schematic for the circuitry for a valve relay box;

FIG. 35 is a schematic of the circuitry for the yaw or pitch control gyroscope;

FIG. 36 is a schematic of the circuitry of the roll control gyroscope;

FIG. 41 is a graph of missile warhead weight versus launching weight, illustrating curves of warhead and launching weights for various ranges of the missile;

Figure 1A:
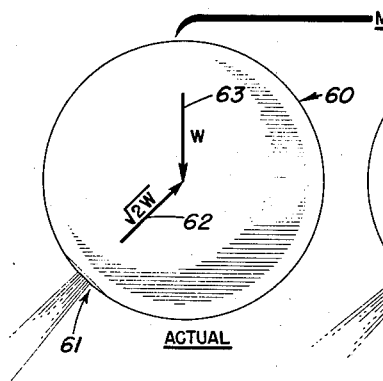
FIGS. 1A through 1G illustrate schematics of the missile, with the main propulsion jet in various positions.

In accordance with the invention, a subsonic, line-of-sight guided missile is provided. This weapon is an anti-tank, anti-personnel, and/or anti-emplacement service missile, and in its main characteristic, it is like a piece of artillery, needing no major attention or checking by the front line troops because it is considered that it would be impractical for the users or operators to acquire the necessary skills.

A guidance compartment is provided in the missile. The missile is arranged so that all of the components of the guided system are ready for use at any time with minimum warm-up. Upon pushing a button, the missile readies itself and leaves the launcher in a matter of one or two seconds, as will be subsequently described.

The lifting, propulsion and guidance of the missile are achieved solely by jet reaction, which eliminates the necessity for lifting surfaces. In this missile, aerodynamic torques and lift forces are eliminated due to the use of a spherical configuration. The missile is in the form of a sphere that is approximately two feet in diameter, and weighs approximately 300 pounds. The terminal velocity of the missile is approximately 450 feet per second at sea level.

Control of the missile is divided into two phases, that is, the maintenance of a constant mean main propulsion jet direction in the absence of guidance signals; and provision of means for displacing and controlling the mean main propulsion jet direction by command signals from a controller or operator. This is accomplished through the use of an internal autopilot system, with an over-riding command type guidance system.

The internal autopilot system stabilizes the missile orientation and maintains a constant missile heading in the absence of guidance signals. In this system, three free gyroscopes provide reference planes for the roll, pitch, and yaw movements of the missile. These gyroscopes control the operation of roll, pitch, and yaw control valve arrangements, and the latter, in turn, controls the direction of tangential gas jets issuing from spaced pairs of ports located on the surface of the missile. When the missile deviates from the desired orientation, a pick-off on one of the gyroscopes closes a relay, and the latter actuates a solenoid, causing reversal of the appropriate control valve, which restores the missile to the desired orientation. The pitch and yaw gyroscopes are modified to accept guidance signals by addition of movable over-ride or guidance contacts. A guidance operator observes the missile in flight and sends corrective guidance signals when the missile deviates from the desired trajectory. These guidance signals move the over-ride contacts, causing the missile to rotate to a new orientation which will produce the desired change in trajectory.

The torque produced by the appropriate auxiliary control jet is in such a direction as to eliminate the initial deviation from the reference direction. The error detecting and correcting arrangement can be stabilized by permitting slip between the pick-off arm and the gyroscope reference axis. This arrangement allows the missile to hunt about a mean direction with an amplitude of approximately one (1) degree.

Due to the fact that asymmetries occur in the roll, pitch or yaw jet thrust from the control valve arrangements, alignments of the main jet issuing from the main propulsion nozzle, and relay delay times, this simple hunting system does not maintain an accurate mean main propulsion jet direction and a slow drift of the missile can occur. This drift of the missile is overcome by a second pair of contacts, which as previously pointed out, are the over-ride contacts. These contacts have an angular spacing of approximately two (2) degrees. When the angular drift of the missile causes one of these contacts to be actuated, the normal hunting cycle is modified in such a way that the drift of the missile is eliminated. The end result is that the missile is restrained to hunt within the small angular sector defined by the over-ride contacts.

The missile is provided with a guidance system which provides a means and a method for controlling the mean direction of the main propulsion jet. This is achieved by making the over-ride contacts movable with respect to the gyroscope reference direction. The over-ride contacts may then be moved clockwise or counter-clockwise by means of a small radio command controlled direct current motor mounted in the gyroscope. The angular movement of the over-ride contacts is controlled on a time basis, that is, the motor runs at a fixed speed of fifteen (15) degrees per second, and the angular signal transmitted is directly proportional to the signal transmission time. The autopilot system mentioned above is duplicated in roll, pitch, and yaw, with the exceptions that the pitch and yaw gyroscopes are equipped with movable over-ride contacts, as indicated above, and the roll gyroscope has stationary over-ride contacts.

A radio link is maintained with the missile during its flight along a trajectory. This radio link is similar to that used in guided bombs. The guidance signal consists of a 220 megacycle R.F. carrier frequency which is modulated by four audio tones. On the ground, within a reasonable and safe distance from the missile, the guidance operator sends the desired signals by means of a control mechanism which keys the audio oscillators, and which, in turn, frequency modulates the output of a two (2) watt F.M. transmitter with the appropriate audio tones. The 220 megacycle R.F. carrier frequency is vertically polarized to provide maximum field strength along the ground. Frequency modulation is utilized because of its noise suppression characteristics and audio limiting properties.

In the missile, the carrier frequency is picked up by a half wave slot antenna and fed to a miniature F.M. receiver, which has automatic frequency control to compensate for any frequency drift in the R.F. carrier. The demodulated signal is then passed through selective inductance-capacitance filter sections which separate the audio tones. Each audio tone is then fed to a relay which operates when its associated audio tone is present. These relays, in turn, supply power to the direct current motors, controlling the position of the over-ride contacts on the pitch and yaw gyroscopes.

In the center of the missile, there is provided a rocket motor. It contains an eighty (80) pound charge of O.G.K. cast double base propellant in the form of two cylindrical grains inhibited on the sides and outer ends. Burning takes place on the inner faces only so that possible changes of the center of gravity of the missile are minimized. A black powder igniter and booster strip are inserted between the charges to fire the rocket grains. Approximately seventy-six (76) percent of the gases exhaust radially through the main propulsion jet to produce a thrust of approximately 420 pounds. The remaining twenty-four (24) percent of the liberated gases go through a cooling system before passing into the roll, pitch, or yaw control valve arrangements. The theoretical propellant specific impulse is approximately 200 pounds thrust per pound per second. The overall missile impulse is approximately 100 pound seconds.

The roll, pitch, and yaw control valve arrangements are provided for controlling the direction of flow of the roll, pitch, and yaw jets issuing from pairs of spaced ports on the missile surface through the use of magnetically actuated butterfly elements or spiders which are placed in the flow streams of the exhaust gases from the rocket motor in the missile. The passageway for the liberated exhaust gases for each valve arrangement includes a nozzle which may be connected to either of two oppositely directed exhaust ports.

Control of the exhaust gases is achieved by means of the butterfly type valve element or spider mentioned above, which is pivotally mounted adjacent the nozzle, so that the exhaust gas stream may flow to either of the spaced exhaust ports, depending upon the position of the butterfly valve element. The butterfly valve element, in turn, is actuated by a magnetic motor energized from any suitable source, such as the autopilot or radio systems previously described.

Figure 1B:
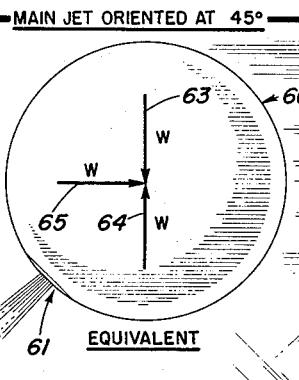
Figure 1C:
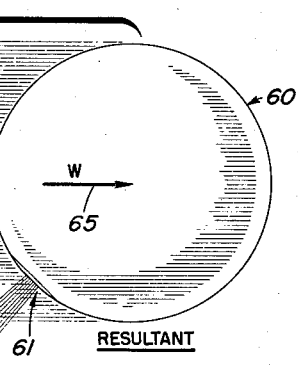

Referring now to FIG. 1A of the drawings, there is illustrated a schematic of a missile 60, comprising the present invention, in which the lifting and propulsion forces are supplied by a rocket motor exhausting through a radial and main propulsion jet nozzle 61 which is oriented so that the horizontal and vertical components of the jet thrust force 62 are approximately equal to the missile weight 63 (W). The propulsion jet force 62 has been shown to be of the order $\sqrt{2}.W$, where W is the weight of the missile 60, so that, with the main propulsion jet nozzle 61 oriented at 45° to the vertical, the resultant vertical and horizontal components 64 and 65 of the thrust force 62 are equal to the missile weight 63 or W as shown in FIG. 1B.

The vertical component 64 of thrust force 62 provides the lifting force necessary for level flight. The horizontal component 65 of thrust force 62 provides a forward acceleration of the order of one (1) g to accelerate the missile 60 to its terminal velocity, which is determined by the missile drag. The vertical and horizontal components 64 and 65 of the thrust force 62 are maintained at a value approximately equal to the missile weight throughout the flight of the missile by use of a regressive burning charge or propellant which will be described subsequently. This charge produces less thrust as the missile 60 decreases in weight, due to consumption thereof.

Figure 1D:
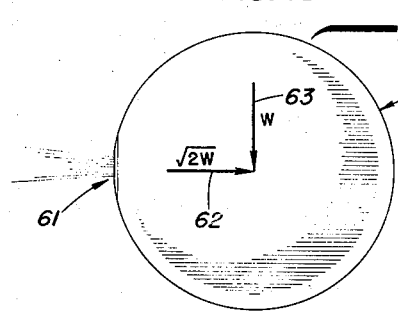
Figure 1E:
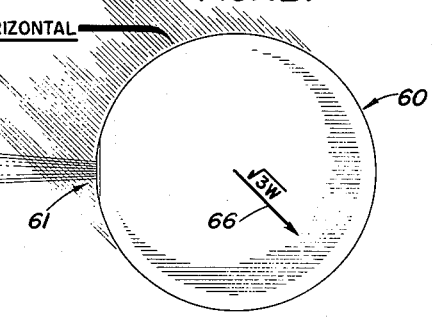

Control and stabilization of the missile is achieved by causing the missile 60 to rotate about its axis. For example, if the missile 60 is rotated about its horizontal axis so that the main propulsion jet nozzle 61 becomes horizontal, as illustrated in FIG. 1D, the missile weight 63 acts vertically downward to produce a downward acceleration of one (1) g, and the thrust force 62 accelerating the missile 60 is $\sqrt{2}.W$, giving a resulting downward thrust force 66, at a 45° angle to the horizontal, of $\sqrt{3}.W$, as shown in FIG. 1E.

Figure 1F:
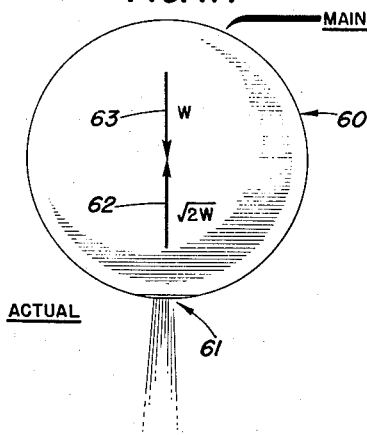
Figure 1G:
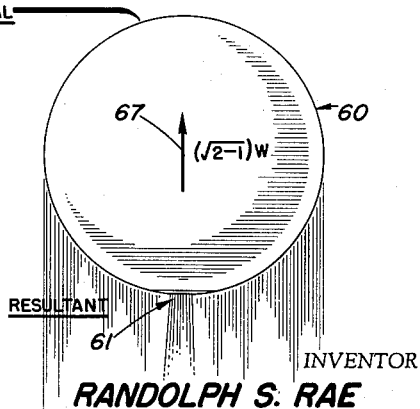

If the missile 60 is rotated so that the main propulsion jet nozzle 61 is exhausting straight downwardly, as shown in FIG. 1F, the resultant thrust force 67 acts against gravity to produce an upward acceleration of $(\sqrt{2}-1)W$, as illustrated in FIG. 1G. Similarly, rotations about the vertical axis would change the direction of applied thrust so as to produce lateral accelerations.

Referring now to FIGS. 4 and 5 of the drawings, for greater detail of the invention, there is shown the spherically shaped aerial missile 60 having a thin aluminum metal skin 71. Within the skin 71, there is located a rocket motor 72. Rocket motor 72 is secured to the metal skin 71 of the aerial missile by means of annular flange members 73 and 74. These flange members can be attached to the motor 72 by welding or the like and to the missile skin by screws 75 fitting in threaded holes 75'.

Rocket motor 72 has a main cylindrical housing 76, which contains a rocket chamber 79, and two end caps 80 and 81, which are bolted to flange members 68 of housing 76 by bolts 69. These end caps 80 and 81 house a cooling system for cooling the hot gases from chamber 79. This cooling system will be discussed subsequently.

A suitable warhead 82, such as a shaped charge or other type of explosive charge, and a fuze 83, which can be of a contact or proximity type, are provided in a convenient space in the missile, as indicated in FIG. 4. The spherical configuration of the missile 60 is chosen in order to eliminate aerodynamic effects from the control system as will be indicated subsequently. This configuration also makes it possible to more effectively handle and store the missile.

Within the rocket motor 72, as shown best in FIG. 4, there is located in the chamber 79 an eighty (80) pound charge of O.G.K. cast double base propellant which is in the form of two grains 85 and 86, which are supported at the ends 84 by screws 90 which pass through the housing 76. These grains are tapered except on the end surfaces 88 and 89. The grains 85 and 86 are inhibited on surfaces 87 and end surfaces 88 so that grains 85 and 86 burn from the surfaces 89 outwardly to surfaces 88 in order to maintain the center of gravity of the missile 60. The surfaces 87 of grains 85 and 86 have been tapered approximately four (4) degrees so that as the mass of the missile 60 decreases, the thrust of the missile likewise decreases. The grains of the rocket can be designed so that the acceleration of the missile increases with constant thrust. This can be accomplished by making the grains cylindrical.

A suitable detonating device, such as a black powder igniter 91, and a booster strip 92, shown in FIGS. 5 and 23, are utilized to ignite grains 85 and 86. Igniter 91 includes a metal housing 93, which is externally threaded at both ends 94 and 95. The threaded end 94 of housing 93 is received by a threaded aperture 96 in housing 76, while the other threaded end 95 receives a threaded igniter head 97.

Housing 93 has a cylindrical bore 98 provided in it at end 94 for receiving a plastic container 99. The plastic container 99 is closed at end 100. Container 99 is held securely in the housing 93 by means of countersunk screws 101. It contains a squib 102, and the remaining space therein is filled with black powder 103.

Figure 38:
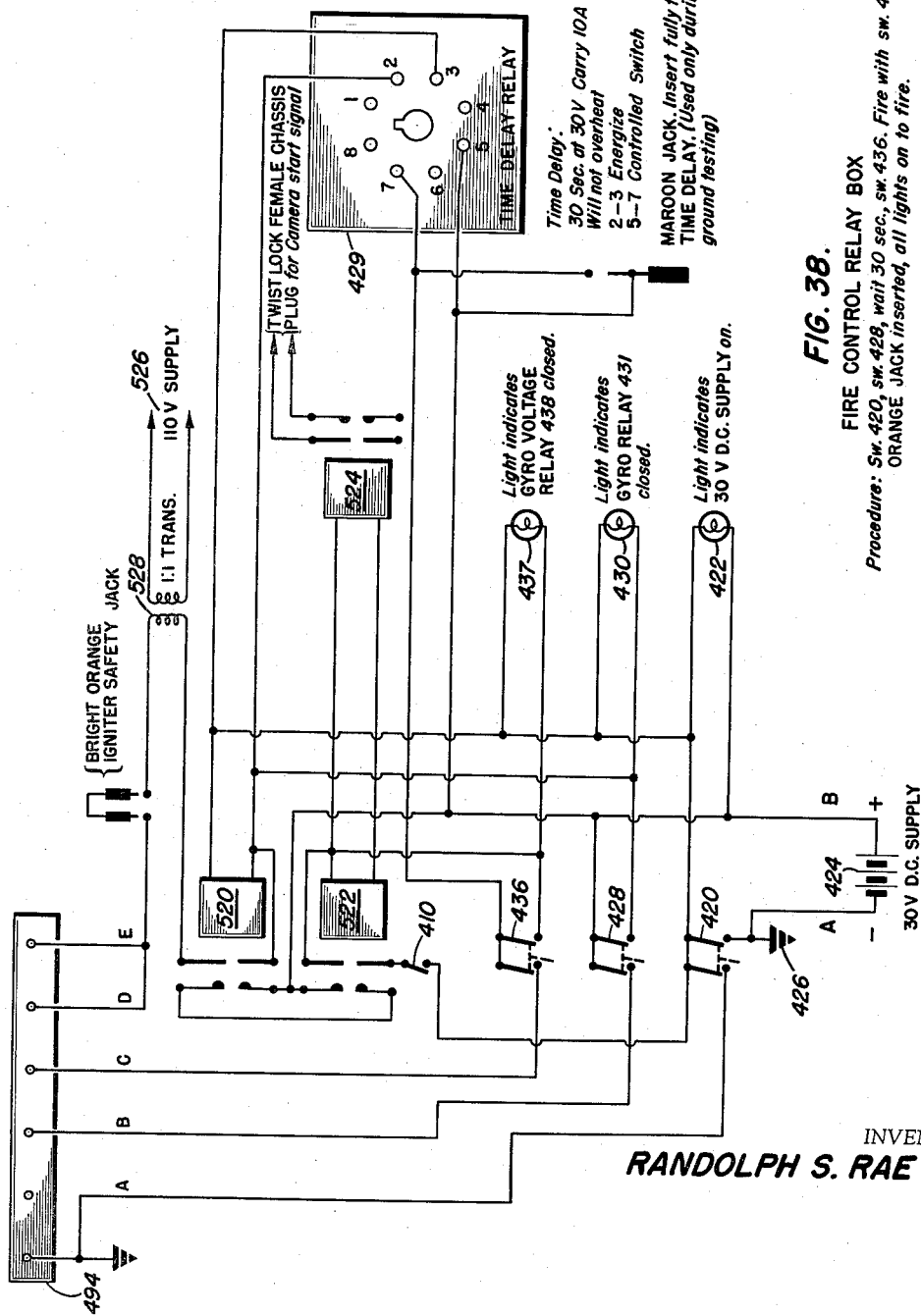
FIG. 38 is a schematic of the circuitry for the missile fire control box.

Squib 102 is connected by means of leads 104 and 105 to a firing button 410 or switch, as shown in FIG. 38. Lead 105 is connected to ground through housing 93. The booster strip 92 is generally of ring shape, and is located between the grains 85 and 86 as shown. Upon pressing the firing button 410, the squib 102 is exploded to ignite the black powder 103 and, thence, the booster strip 92. The latter, in turn, ignites the rocket grains 85 and 86.

The gases generated during the burning of the rocket grains 85 and 86 are utilized to propel and control the missile 60 in flight. Approximately seventy-six (76) percent of the products of combustion or gases liberated by the burning of the grains 85 and 86 are fed directly from the rocket chamber 79 to a main propelling and lifting jet nozzle 110 of the missile 60 to be exhausted radially therefrom to produce a thrust of approximately 420 pounds.

In addition, approximately twenty-four (24) percent of the liberated products of combustion or gases are fed to control valves 111, 112, and 113, shown in FIGS. 6, 7, 8, 9, 10, 11 and 22, which are provided for controlling the pitch, yaw and roll movements of the missile 60 by controlling the direction of the pitch jet, yaw jet or roll jet issuing from spaced ports provided for these valves, respectively.

The main propelling and lifting jet nozzle 110 is shown in detail in FIG. 17. It consists of a convergent-divergent nozzle member 124 which can be composed of carbon and forming a reduced cross-section or throat 125, and a cold rolled steel member 126, which has a cylindrical portion 127 that surrounds nozzle member 124, a divergent nozzle portion 128 which is a continuation of nozzle member 124, and a cylindrical nozzle portion 129, which is a continuation of divergent nozzle portion 128.

A cylindrical metal member 132 is used to attach nozzle 110 to the rocket motor housing 76. One end 133 of member 132 is secured to housing 76, by welding, such as indicated by weld 137, while the other end 134 is attached by Allen head screws 138 to an annular shoulder portion 139 on member 126. A suitable annular seal 140 of copalite cement or the like can be provided between member 132 and member 126.

A heat protecting shroud or shield 142, having a conical portion 143, is used to shield the hot nozzle 110 from other components in the missile 60. Shield 142 can be secured to the skin 71 of missile 60 by screws 144, having a washer 145. A portion of the products of combustion or gases liberated during the burning of the rocket grains 85 and 86 shown in FIG. 5, pass from the rocket chamber 79 radially outwardly through the nozzle 110 to the atmosphere to lift and propel the missile 60 as previously indicated.

Valves 111, 112, and 113 are connected to the rocket chamber 79 by suitable passageways, and are utilized to control the direction of the portions of the products of combustion or the gases escaping from the chamber 79 of the missile, and thus are utilized to stabilize the orientation of the missile along a trajectory. The gases, however, before passing through valves 111, 112, and 113, are first passed through a suitable cooling system, which will now be described.

The gases in the rocket chamber 79 are at a temperature of approximately 3500° F. and must be cooled before passing through each control valve 111, 112, and 113. Water 158 for cooling the hot gases is contained in rubber cement coated bags 160, as shown in FIGS. 5 and 19, one each housed in the end caps 80 and 81, and located adjacent the housing 76 for the rocket motor 72. The end caps 80 and 81 are separated from the chamber 79 of the rocket motor 72 by metal partition members, 167, one at each end of chamber 79. The partition members 167 are secured to annular rim members 169, by means of countersunk screws 170. Rim members 169 can be formed integral with the end caps 80 and 81 or can be welded thereto. The water bags 160 can be secured to the rim members 169 by suitable means, or the flat edge portions of the bags 160 can be laid against the rim members 169. The hot gases from the rocket chamber 79 enter into the end caps 80 and 81 through a series of apertures 171 located along the periphery of rim members 169 shown in FIGS. 19 and 20. Three pounds of distilled water 158 is contained in each bag 160. The bags 160 are subjected to the pressure of the rocket gases, which is approximately 1200 p.s.i.

In each water bag 160, there is located a cylindrical tube member 174 having a series of small apertures 175 for receiving the water 158 from the water bag 160 when the hot gases in the end caps 80 and 81 compress these water bags. The cylindrical tube member 174 is also provided with two annular flanges 176 and 177 which prevent the water bags 160 from completely collapsing due to the pressure exerted by the gases on the water bags. This will eliminate any possibility that the water will not be forced out of the bags 160.

In one embodiment of the cooling system, illustrated in FIGS. 15, 16, 19 and 21, the water, under pressure, enters the cylindrical tube member 174 through the apertures 175, and passes through a passageway 178 located in a suitable fitting 179 mounted in the wall of water bag 160 and the wall of the end cap 80 or 81. The water passes through the fitting 179 to a copper pipe 180, and thence, to a valve 181, shown in FIG. 21.

Valves 181, one of which is shown in detail in FIG. 21, are used to hold the water 158 in the water bags 160 during shipment and handling of the aerial missile 60. However, in actual operation, the water in bags 160, under pressure from the hot gases, forces a plunger 190 located in a cylinder 191, contained in each valve 181, from an inoperative position of holding the water in the bags 160 to an operative position to allow the water 158 to pass through an exit 192, provided in each valve 181. The water passes through the exit 192 to copper tubing 193, and thence to a convergent-divergent nozzle 208, shown in FIG. 15. O-rings 194 and 195, provided in grooves 196 and 197 in plunger 190 of valves 181, are utilized to keep the plunger 190 in an inoperative position.

Figure 7:
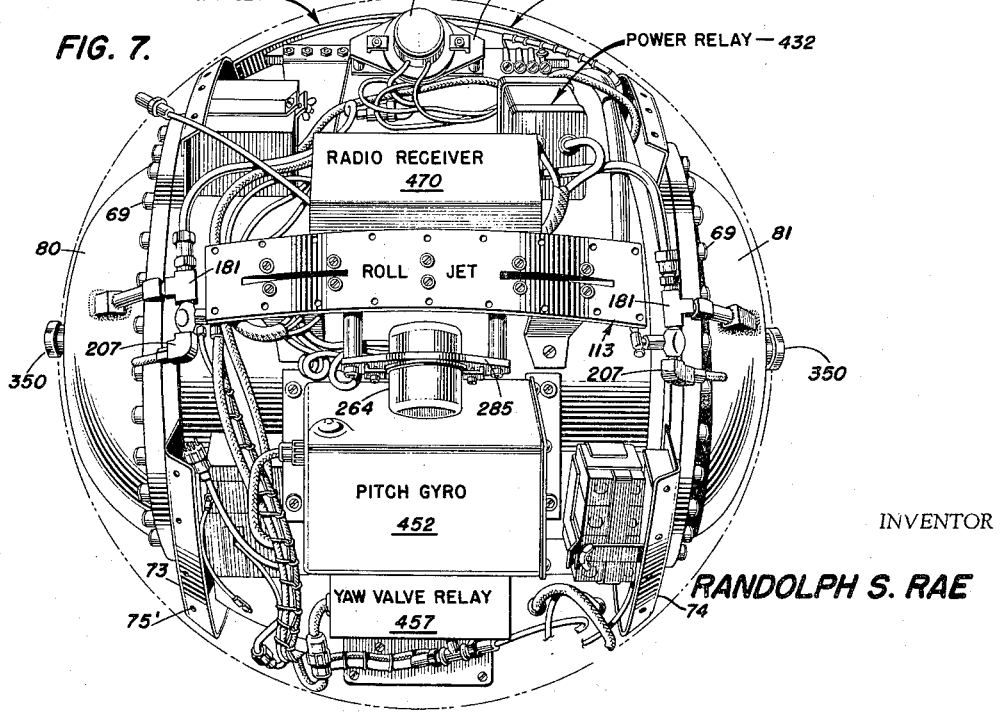
FIG. 7 is a perspective view of the missile with the skin removed and the missile rotated 90° from bottom to center in that order from the position illustrated in FIG. 6.

However, when sufficient pressure is supplied to the upper head 198 of plunger 190, the plunger is forced to move in the cylinder 191 until the lower head 199 of plunger 190 abuts against a shoulder 200 of a collar 201 which fits about the plunger 190 and closes the end 202 of valve 181. Collar 201 is attached to the valve housing by means of Allen head screws 205. As shown in FIG. 7, filling valves 207 may be attached to the valves 181 for filling the bag 160 with water. Each filling valve 207 has a petcock 209. Valves 181 have been designed to provide rapid opening when the 100 pound pressure differential is applied after the ignition of the rocket grains 85 and 86.

Figure 15:
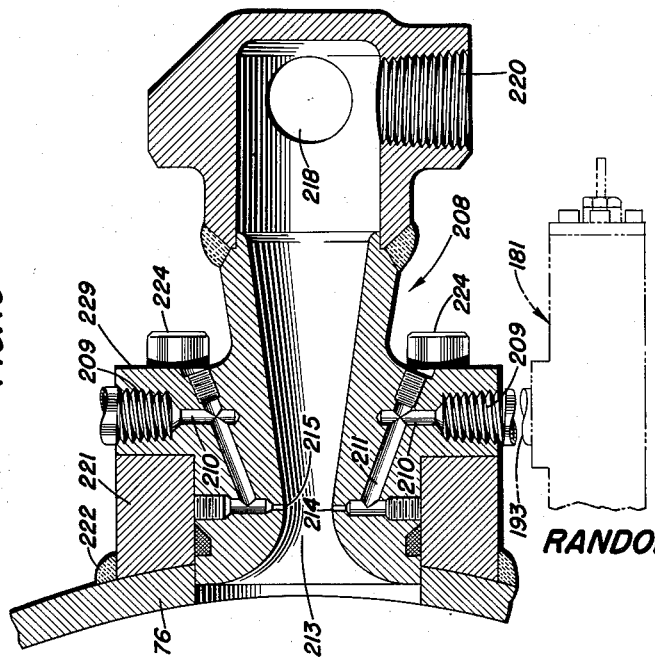
FIG. 15 is a section taken along line 15—15 of FIG. 16 showing one embodiment of a water cooler nozzle attached to the rocket motor, with a coolant line valve illustrated in dash-dot lines.
Figure 27:
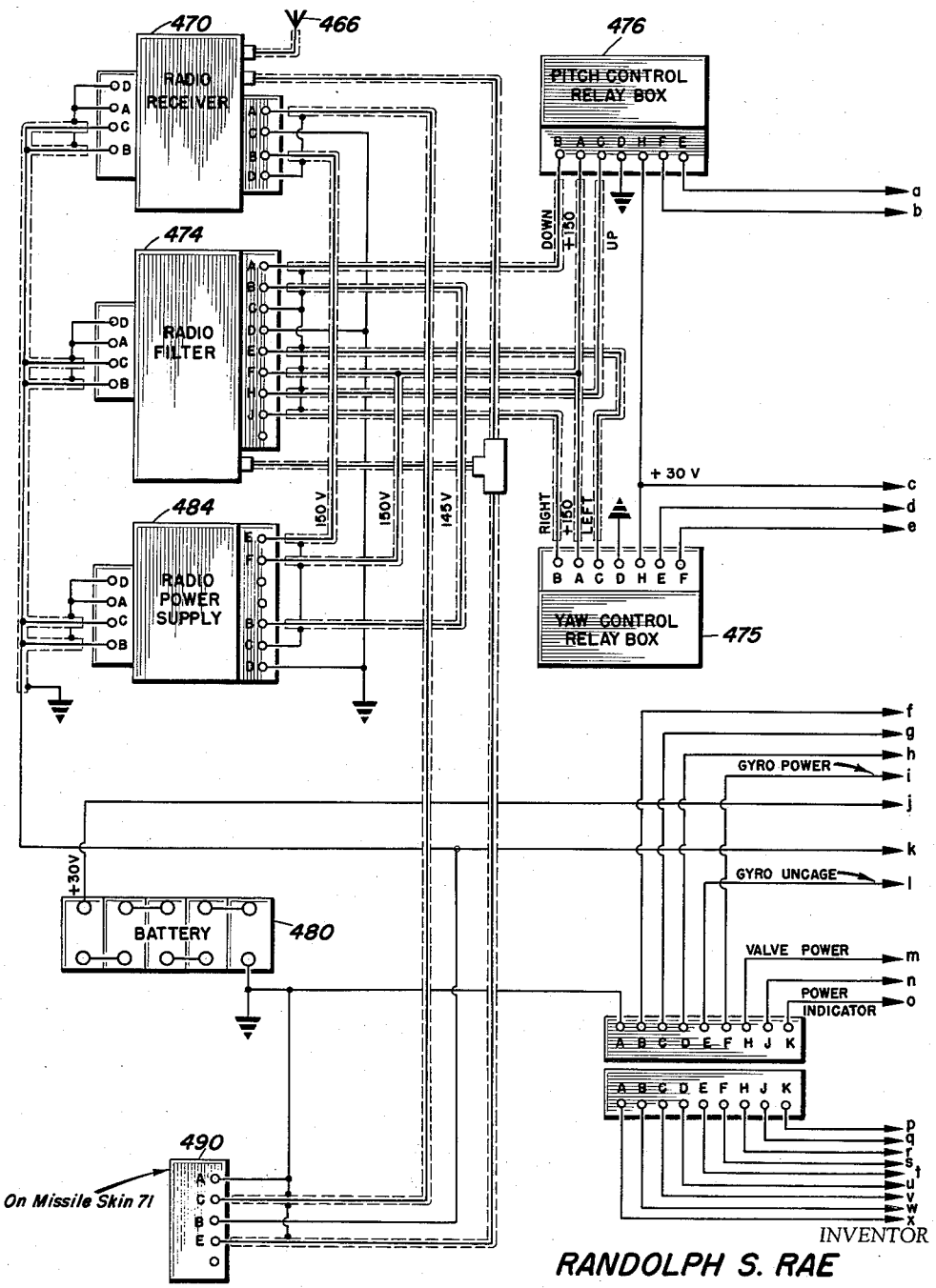
FIG. 27 is a schematic of a portion of the missile circuitry.

The water from the valves 181 is introduced into a nozzle 208, FIG. 15, through two openings 209 and passageways 210 and 211. The water is injected at the throat 213 of nozzle 208, through two orifices 214 and 215. The products of combustion or gases leave the rocket chamber 79 through the convergent-divergent nozzle 208.

This nozzle 208 was designed to produce a pressure at the throat 213 thereof of approximately 100 p.s.i. below the pressure in the rocket chamber 79. This 100 pound pressure differential existing between the pressure in the rocket chamber 79, and the pressure at the throat 213 of the nozzle 208 serves to inject the water through the metering orifices 214 and 215 in the wall of the throat 213.

Figure 6:
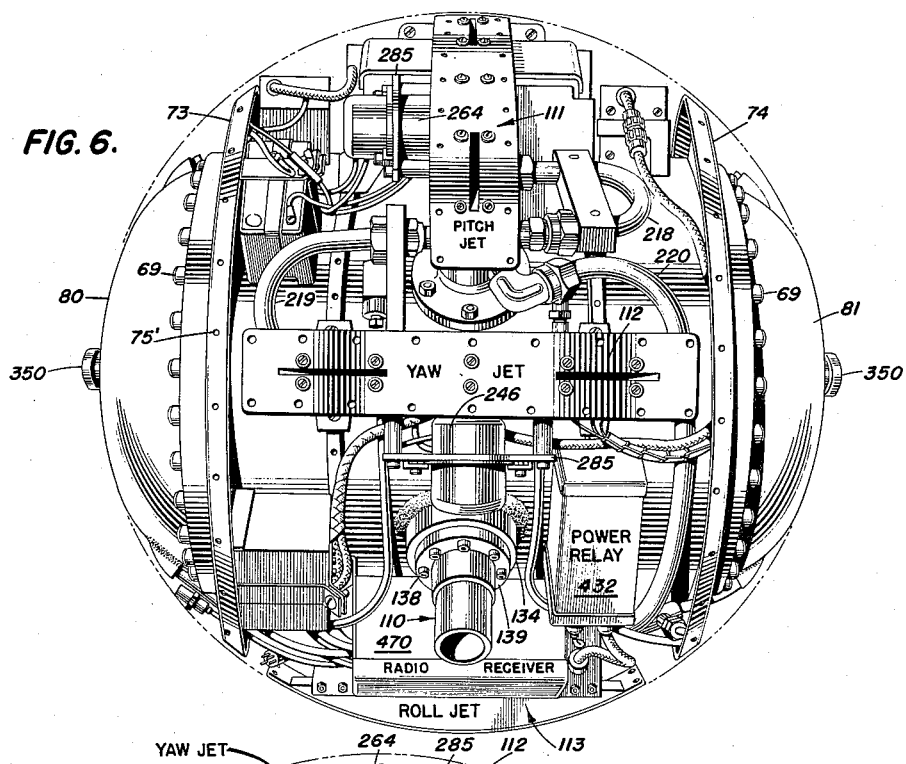
FIG. 6 is a rear perspective view of the missile with the skin removed.
Figure 16:
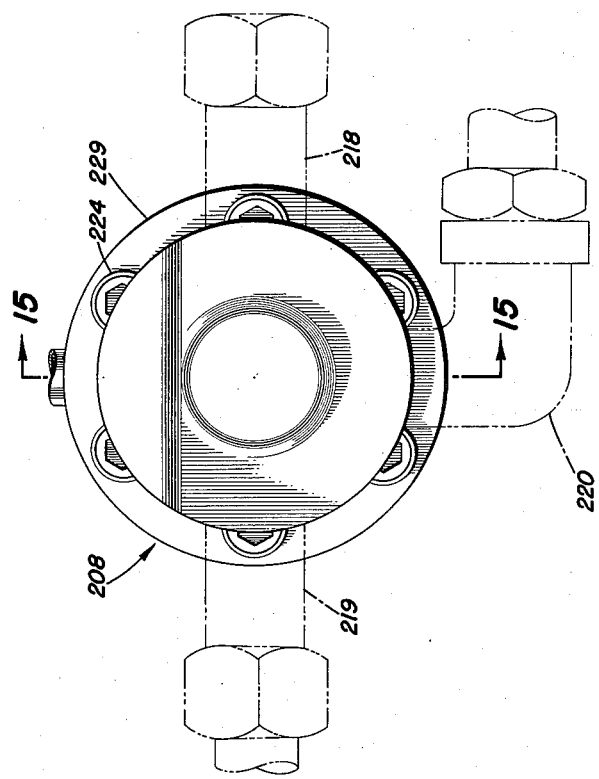
FIG. 16 is an elevational view of the water cooler nozzle shown in FIG. 15, showing, in dash-dot lines, the three exhaust passageways to the various control valve arrangements.

The water-gas stream passes through the nozzle 208 and out passageways 218, 219 and 220 to the pitch control valve 111, the yaw control valve 112, and the roll control valve 113, respectively, as shown in FIGS. 6, 9, and 16. The water to gas ratio is of the order of 0.3, and with this ratio the arrangement described produces a well mixed stream and reduces the temperature of the gases to approximately 2000° F.

Nozzle 208 is usually fabricated of 18-8 stainless steel. It is secured to the housing 76 of rocket motor 72 by means of a short cylindrical member 221 which is welded at 222 to the cylindrical housing 76 of rocket motor 72. Bolts 224, passing through an annular shoulder 229, on nozzle 208 are used to secure the nozzle 208 to the cylindrical member 221.

In another arrangement of the cooling system as shown in FIGS. 18, 19, 21, and 22, the water bag arrangements in the end caps 80 and 81 are similar to the cooling system described above, including the valves 181 and 207. However, instead of using one convergent-divergent cooling nozzle 208, as shown in FIG. 15, three water cooling nozzles, such as nozzle 233 shown in FIG. 18 are utilized, one for each control valve, such as 111, 112, and 113.

The water cooler nozzles 233 are secured to the housing 76 of the rocket motor 72 by means of screw threads provided in end 234 of each nozzle 233. The threaded ends 234 are then received in threaded apertures in the walls of the housing 76 of rocket motor 72. Jam nuts 235 are used to hold the nozzles 233 in secure positions. The other end 236 of each nozzle 233 is threaded at 237. End 236 of each nozzle 233 is secured to one of the control valves, such as 111, 112, or 113, by means of the threads 237 and a jam nut 240.

The water 158 forced out of the water bags 160, by means of the gas pressure from the rocket chamber 79, passes through the handling valves 181, through passageways 241, 242, 243, 244, 245, and 246, as shown in FIG. 22, to the three nozzles 233, one each of which is provided for the pitch control valve 111, the yaw control valve 112, and the roll control valve 113. The water 158 passes into each valve 233 through entrances 247 and 248, and it is injected into the gas stream from the rocket chamber 79, through the two apertures or orifices 249 and 250, respectively. The water, on mingling with the hot gases from the rocket chamber 79, reduces the temperature of the latter to approximately 2000° F. The water-gas mixture then passes out of the nozzle 233 to its corresponding control valve 111, 112, or 113.

The valve arrangements 111, 112, and 113 utilized for each of the control gas jets are identical. In one of the valve arrangements, such as the pitch valve arrangement 111, as illustrated in FIGS. 10 through 14, a pair of opposed ports 250 and 251 are provided in the skin 71 of the aerial missile 60, and in the principal longitudinal plane thereof. These ports 250 and 251 are connected by passageways 252 and 253 to a nozzle 254. Nozzle 254, in turn, is connected by passageways 257 and 219 to the convergent-divergent nozzle 208 or to the convergent-diverging nozzle 233. The ports 250 and 251, passageways 252 and 253, nozzle 254, and passageway 257 are located in a stainless steel casting, which can comprise two sections 258 and 258A. These sections are secured together by Allen head screws 259 after being aligned with each other by pins 259A. This casting can be made by the investment casting method of reproducing metal parts which have critical dimensions. The ports 250 and 251 as well as the passageways 252 and 253 are carefully machined to provide exactly balanced sections. The pitch valve arrangement 111 can be mounted to the skin 71 of the missile 60 by suitable means, such as by screws 260 or the like.

The flow of the gas from the nozzle 254 to either of the ports 250 and 251 through the passageways 252 and 253 is controlled by the butterfly type valve or spider 261, as shown in FIGS. 10 and 14, which is pivoted about a pivot shaft 262 adjacent the nozzle 254. In one position of the valve spider 261, all of the gases flowing from the nozzle 254 will flow from the port 250 in one principal direction, and will cause the missile 60 to rotate about its principal horizontal and transverse axis in a direction opposite to the flow of the gases, that is, in the direction of the reaction forces or torque forces developed by the flow of gases through the port 250.

The gases from the convergent-divergent nozzle 208 or the convergent-divergent nozzle 233 pass through the passageway 257 through the two dimensional throat of nozzle 254 and are deflected to the left or right of the movable butterfly type valve or spider 261. The contour of the spider 261 and the walls of the passageways 252 and 253 are chosen so that the gases expand nearly isentropically around the corner and emerge as a tangential supersonic jet from either the ports 250 or 251. A small counterclockwise rotation of the spider 261 causes the jet to reverse its direction. The center of rotation of the spider 261 about pivot shaft 262 is chosen so that a minimum torque is required to effect this reversal of position of the spider 261. This is done by a magnetic actuator or solenoid 263 acting through a simple link mechanism which will be described subsequently.

The torque inertia characteristics of the pitch valve assembly 111 are such that a reversal time of the order of 10 milliseconds is obtained. It is to be observed that the valve arrangement 111, as well as the other valve arrangements 112 and 113, provides a "bang-bang" action and not a proportional action.

Each of the three valve arrangements, that is, the pitch valve 111, the yaw valve 112, and the roll valve 113 consumes approximately eight (8) percent of the rocket gases that are liberated due to the burning of the rocket grains 85 and 86 in the chamber 79. The jet force developed by each gas jet is in the order of thirty (30) pounds which results in an angular acceleration of the missile 60 of approximately 400° per sec.$^2$. The valve spider 261 and the discharge throat 254 are machined from molybdenum. However, cast stainless steel spiders can be used.

When the valve spider 261 is in a neutral position as mentioned hereinafter, the gases will be balanced and will cause no reaction or thrust torque force. Consequently, the missile 60 will continue on its course. But, when the valve spider 261 is advanced to the position shown in FIG. 10, gases will be directed through the passageway 253. When the spider is shifted to its opposite position, gases will be directed through the passageway 252.

The magnetic actuator 263 is provided for the valve spider 261. This magnetic actuator 263 comprises a magnetic motor 264 having a rotatable shaft 266 operable on the energization of the motor 264 in one polarity to rotate the shaft 266 in a given direction, and an energization of the motor 264 in the opposite polarity to reverse the rotation of the shaft 266. One end 269 of a crank arm 270 is attached to the motor shaft 266 by a pin 272. At the other end 273 of crank 270 there is provided a pin 274. Crank 270 and pin 274 drive a slotted crank arm 278 on the pivot shaft 262, which controls the movement of the valve spider 261. The pivot shaft 262 thus is operable to turn the valve spider 261 in response to the rotation of the shaft 266 of the motor. It is to be noted that crank 270 is slotted at end 269 so that it can receive motor shaft 266. An adjusting screw 276 is utilized for drawing the end portions of the slotted end 269 of crank 270 into frictional engagement with the shaft 266.

Suitable stops, such as adjustable screws 280 and 282, are provided in brackets 283 and 284, for the crank and pin arrangement 270 and 274 so that the valve spider 261 can be turned exactly to the desired position. In the extreme position of the valve spider 261 in either direction, the spider 261 will completely close the passageway 252, and leave the other passageway 253 completely open, or vice-versa. However, in its neutral position, the motor 264 is biased to mid-position between the extremes so that unless the motor 264 is energized there will be no control action on the missile 60 itself. The motor 264 may be controlled in a large number of ways such as by a command control, by predetermined selection control, or by homing control.

Motor 264 is supported by a suitable metal plate 285 which is attached to two bosses 286 by Allen head screws 288. Motor 264 is maintained in position by a suitable metal flange 289 secured to the metal plate 285 by metal brackets 290 and Allen head screws 291.

The gases escaping from the pitch valve 111 controls the pitch movement of the jet issuing from the main propulsion nozzle 110 with respect to the center of gravity of the missible 60. For example, when it is desired to lift the missible 60 higher from the ground, the pitch gas jet is so controlled that the missile 60 is rotated about its transverse axis, that is, the principal axis transverse to the direction of movement of the missile 60 along its trajectory so that the main propulsion jet issuing from nozzle 110 has an increased lifting effect to elevate the missile 60, that is, the main propulsion jet is moved downwardly and toward a vertical direction to increase the lift component of thrust.

When it is desired to move the missible 60 forward without increasing the elevation of the missile 60, the pitch jet issuing from the pitch valve 111 is controlled so that the main propulsion jet issuing from the main propulsion nozzle 110 will be rearwardly inclined with respect to the center of gravity of the missile 60. Thus, a portion of the thrust force will be active to propel the missile 60 forward.

In addition, the gases escaping from the yaw valve 112, as previously pointed out, are used to control the yawing movements of the missile 60. This is achieved by adjusting the direction of flow of gases from the jet passageways 252 and 253 by means of the yaw valve arrangement 112. The yaw control valve arrangement 112 is arranged transverse to the principal vertical axis of the missile 60, and in the principal horizontal plane of the missile.

In order to prevent the missile 60 from having rolling movements, that is, from rolling to one side or the other about its principal longitudinal axis, that is, the axis in the direction of principal movement of the missile 60, the roll jet valve arrangement 113 has been provided transverse to the longitudinal axis of the missile 60, and in the principal transverse plane thereof. This roll valve arrangement 113 is provided for controlling the direction of the gas jet issuing from the valve arrangement 113 so that any deviation of the missile 60 about its longitudinal horizontal axis will be corrected by a reaction from the roll gas jet.

In FIGS. 24 through 26, there is shown a launcher 315, for the missile 60. This launcher 315 is extremely simple in construction and comprises basically a base formed of angle irons 320, 322, 324, 326 and 328 and having a top plate 330 thereon. The angle irons and the plate can be welded or bolted together. Vertically mounted angle irons 332 and 334 are located on opposite sides of the base 318 and are supported by metal strut members 336, 338, and 340, which have their ends welded both to the vertical upright 332 or 334 and the base 318, as best seen in FIGS. 24 and 26. A flat metal member 342 is bolted to each upright 332 or 334 by bolts 344. These flat metal members 342 have a portion cut away at their upper ends to form rails 348 and thus receive the bosses or lugs 350 which pass through the missile skin 71 from the rocket motor 72. Thus, by placing the bosses 350 on the rails 348 of the launcher 315, the missile is supported on the launcher 315.

After the missile 60 is placed on the launcher 315, the main propulsion and lifting nozzle 110 is adjusted to the desired angle so that the gas jet issuing therefrom is in the proper direction for launching of the missile. The missile 60 is maintained in proper position by means of one portion 359 of an arm 360 frictionally engaging the skin 71 of the missile. Another portion 363 of arm 360 is supported and arranged to move back and forth between two plate-like members 365 and 366. These members 365 and 366 are, in addition, bolted, by means of bolts 368, to a third plate member 370. Member 370 has two rails 372 provided at opposite sides thereof as best seen in FIG. 24. These rails 372 are secured to plate member 370 by means of bolts 374. The plate member 370 is supported by a vertical bracket member 376 having a slot 378 provided throughout most of its vertical dimension. Bolts 380 are passed through the plate member 370 and the slot 378 to hold the plate member 370 in firm position against the bracket member 376 by means of the nuts 381. The lower end 382 of the bracket 376 can be secured to the base 318 as by welding or by bolts 384 passing through angle irons 386 and the bracket 376. Thus, by loosening the nuts 381 on bolts 380, it is possible to adjust the height of the plate member 370 and the arm member 360. In addition, arm member 360 can be adjusted along a horizontal direction by sliding it between the plate members 365 and 366. After the arm member 360 is placed in the proper position, then screws 388 are adjusted to secure arm 360 in position so as to hold the missile at the proper launching angle.

The control of the missile 60 is resolved in two parts, that is, maintenance of a constant mean jet direction of the gases issuing from the main lift and propulsion nozzle 110, such as shown in FIGS. 6 and 24, in the absence of guidance signals, and the provision of means for displacing and controlling the mean jet direction by commands from a human operator or controller 400, indicated in FIG. 3. Both phases of control and guidance of the missile 60 will now be explained.

With the missile 60 in the desired position on the launcher 315, it is ready for launching after the radio guidance system has been warmed up. The operator 400 views the missile 60 and the target 402, such as the tank illustrated in FIG. 3, through an optical instrument 406. The missile 60 is displaced initially from the line-of-sight 408 by a few degrees before launching, as will be indicated subsequently. On closing a switch 410 in the fire control box shown in FIG. 38 to fire the missile 60, the latter accelerates slowly along a line 412 determined by its orientation on the launcher 315.

The operator 400 then transmits command signals from a transmitter 414 to bring the missile 60 onto the line-of-sight 408 and maintain it there for the duration of the flight along the trajectory to the target 402. If this is achieved successfully, a hit is assured without the operator 400 having range information. It can thus be seen that the characteristics of the missile 60 are especially suited to such a control system in that the most difficult phase, that is, maneuvering onto the line-of-sight 408, is done at low viscosity.

After ignition of the grains 85 and 86, there is approximately a 0.2 second delay before the pressure in the chamber 79 reaches 90% of its full value and about 0.5 second longer to reach full thrust. During this 0.2 second delay, the missile 60 will move horizontally about two (2) inches (zero friction), and consequently, it is for this reason, that launcher 315 is provided to support the missile 60 during this period.

After launching the aerodynamic drag of the missile 60 is at first negligible but increases until the drag equals the rocket horizontal thrust component. Because a constant 45° main jet pitch angle has been selected, the horizontal component of the thrust force equals the weight of the missile 60 (which is decreasing as fuel is used). Thus, the velocity of the missile is low immediately after launching, and this facilitates guidance capture, but the aerodynamic drag continues to increase so that most of the flight of the missile 60 is at a fairly high velocity. This provides protection against ground fire (especially for low altitude ground to ground cases). If the range of the missile 60 is great enough, the flight velocity of the missile 60 will reach a maximum and then start to decrease slowly.

Figure 40:
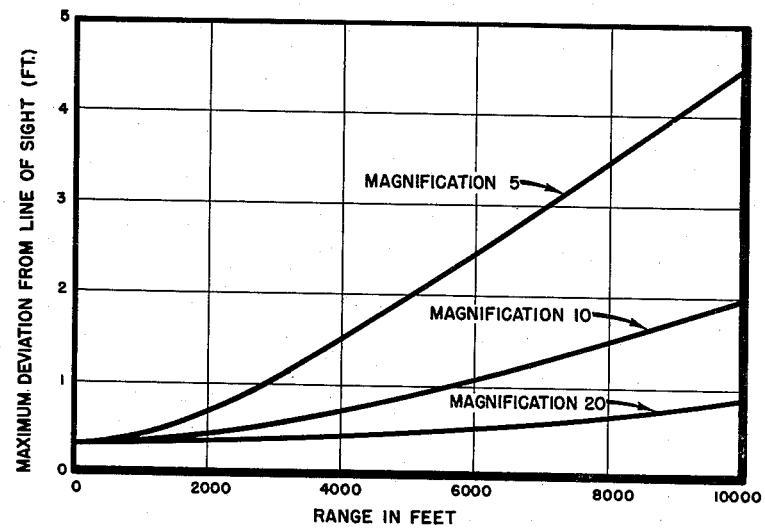
FIG. 40 is a graph of maximum deviation of the missile from line-of-sight versus range of the missile, illustrating curves of magnification and deviation from line-of-flight for a typical missile embodying features of the invention.

As previously mentioned, an optical instrument 406, as shown in FIG. 3, is utilized by the operator 400 in viewing the missile while in aerial flight. This instrument 406 employs the two halves of a standard binocular. Instrument 406 is used during capture of the missile 60, after the latter has been launched from the zero-length launcher 315, illustrated in FIGS. 24, 25, and 26, to magnify and demagnify an object, giving a one (1) to one (1) image with a wide field of view of approximately sixty (60) degrees. A circular graticule indicates the field of the monocular used normally. When the missile 60 is brought within this circle, the demagnifying element is moved to one side leaving normal six (6) to one (1) magnification with a narrow field of view of approximately twelve (12) degrees. FIG. 40 illustrates curves of expected accuracy as a function of range for various telescopes under ideal conditions. These curves are discussed more subsequently.

Figure 37:
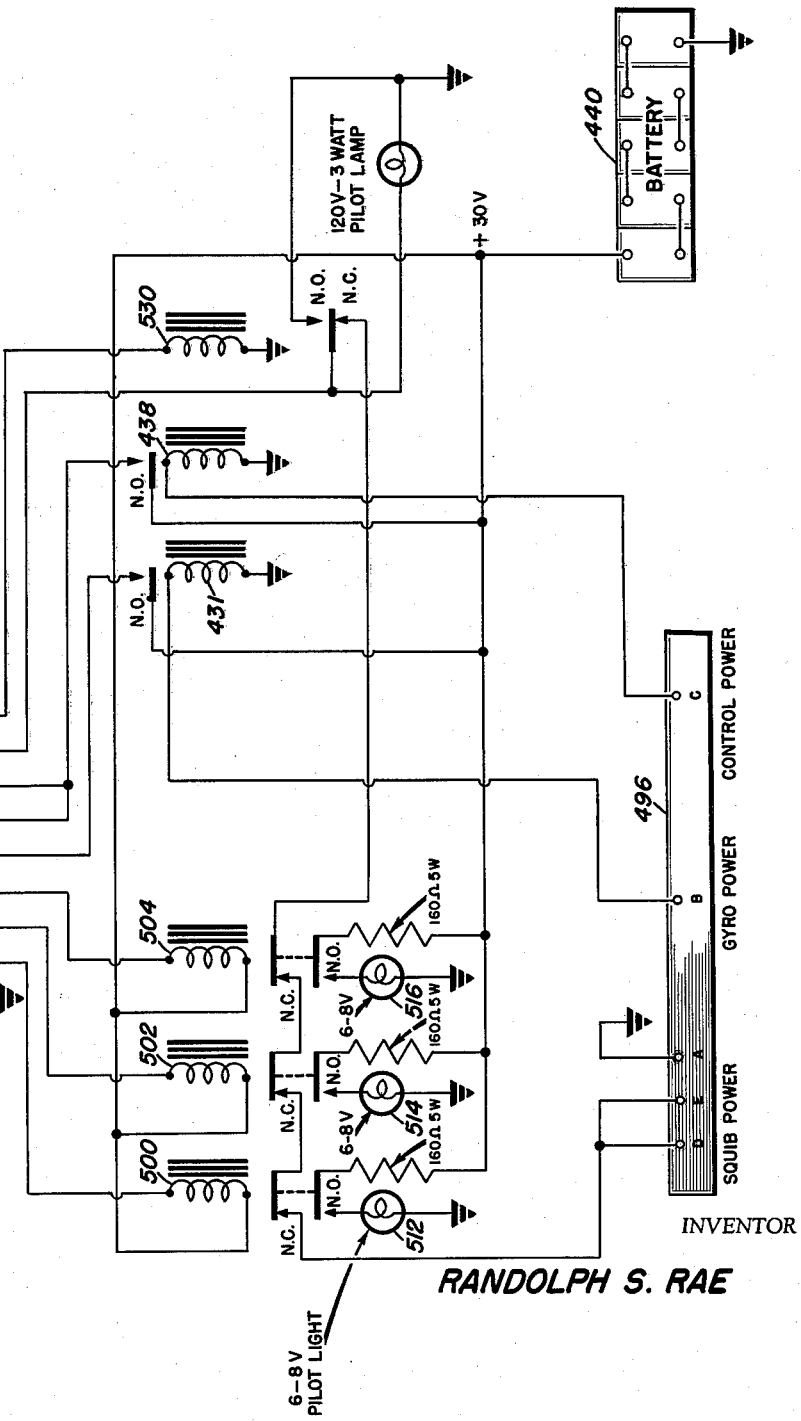
FIG. 37 is a schematic of the circuitry for the missile launcher external control box.

The following procedure is utilized in warming up the missile 60 and readying it for aerial flight, after the external plug 506, shown in FIG. 37, is plugged into the female plug 510, shown in FIG. 28, on the skin 71 of the missile 60, and the male plug 494, in the fire control box shown in FIG. 38, is plugged into the female plug 496 in the launcher external control box shown in FIG. 37. On the missile skin 71, there is provided another plug 490 which is utilized for a warmup and monitoring of a radio receiver 470 and its associated equipment. For convenience in following the electrical circuitry of the missile 60, shown schematically in FIGS. 27 through 38, the various terminals and leads have been lettered. It is to be pointed out that the fire control relay box shown in FIG. 38 is located in the vicinity of the operator 400, while the launcher external control box shown in FIG. 37 is usually located in the vicinity of the missile 60 near the launcher 315.

A toggle switch 420, located in the fire control relay box shown in FIG. 38, is closed which lights up a pilot light 422. Th lighting of pilot light 422 indicates that a 30 volt D.C. power supply 424 is on. In addition, switch 420 completes a circuit through the firing switch 410 in the fire control relay box to ground 426.

A second toggle switch 428, likewise shown in FIG. 38, is then closed. This causes the time delay relay 429, which is used only for ground testing, to be set into operation. It is the function of the time delay relay 429 to prevent firing of the missile 60 before the roll, yaw, and pitch gyroscopes 450, 451 and 452, respectively, shown in FIG. 28, are up to proper operating speed. Upon the closing of toggle switch 428, the pilot light 430 lights up to indicate that a gyroscope relay 431 is closed, and, in addition, the 30 volt D.C. power supply 424 is connected to the relay 431 in the launcher external control box shown in FIG. 37. Relay 431, in turn, supplies 30 volts D.C. from a battery 440 located externally of the missile 60 to the power relay box 432 in the missile 60, shown in FIGS. 28 and 33. A latching type relay 433 (double pole, double throw) in the power relay box 432 is then closed. This relay 433 supplies power from a 30 volt D.C. battery 480, located in the missile 60, to the roll, yaw and pitch gyroscopes 450, 451, and 452, respectively. In addition, this relay 433 supplies power to the radio receiver 470, radio filter sections 474 and a radio power supply 484, shown in FIG. 27.

A third toggle switch 436, in the fire control relay box shown in FIG. 38, is then closed after a sufficient waiting period of approximately 30 seconds. This causes the pilot light 437 to light up and indicate that a gyroscope voltage relay 438, as shown in FIG. 37, is closed. Upon closing of relay 438, 30 volts D.C. is supplied from the battery 440 to uncage the roll, yaw and pitch gyroscopes 450, 451, and 452, respectively, by operating the gyro motors 434 in the roll or yaw or pitch gyroscopes, and thus actuating the gyroscope uncage relays 442 shown in FIGS. 35 and 36. Relay 438 also supplies 30 volts D.C. external power from battery 440 to operate a second relay 443 in the power relay box 432 shown in FIGS. 28 and 33. Relay 443 supplies internal power from the battery 480 to actuate the magnetic actuators 263, shown in FIGS. 11, 29, 30, and 31. This power is supplied through the roll, yaw and pitch valve relay boxes 455, 457 and 458, respectively, except that this power does not operate the relays in these boxes, that is, when the gyroscopes 450, 451, and 452 are not in operation.

In order to insure that the roll, yaw and pitch gyroscopes 450, 451, and 452, respectively, are caged prior to launching of the missile 60, microswitches are provided for these gyroscopes. One microswitch is provided for each gyroscope on the uncaging mechanism to supply a voltage from each gyroscope to operate the relays 500, 502, and 504, in the launcher external control box shown in FIG. 37, initially when the external male plug 506, shown in FIG. 37, is plugged into the female plug 510, shown in FIG. 28, on the skin of the missile 60. Visual indications are given by means of the pilot lights 512, 514 and 516 for the relays 500, 502, and 504, respectively. When the roll, yaw, and pitch gyroscopes 450, 451 and 452, respectively, are uncaged, the relays 500, 502, and 504 are de-energized, thus allowing the missile 60 to be fired.

The firing or push button switch 410, in the fire control box in FIG. 38, is then closed, causing the relays 520, 522 and 524, contained in this relay box, to be closed and the switch 410 to be connected to ground 426. This supplies 110 volts A.C. from a 110 volt source 526, through an isolation transformer 528, to the squib 102, shown in FIGS. 23 and 28, in the missile 60 through the relay 530 in the launcher external control box and through the relays 500, 502, and 504. Relay 530 is actuated by the external power supply 440. When the internal relay 443 in the power relay box 432 in FIGS. 28 and 33 is actuated with the internal power from the battery 480, the relay 530 is de-energized, thus allowing the missile 60 to be fired. The purpose of this relay 530 is to insure that the mechanical latch on the internal relay 443 in the power control box 432 is latched or closed.

In the missile 60, there is provided an internal autopilot system which stabilizes the orientation of the missile, and, hence, maintains a constant heading of the missile 60 in the absence of guidance signals. Since the internal autopilot system is duplicated in pitch, yaw, and roll, it will suffice to explain the system in a single plane, such as the roll plane.

Figure 29:
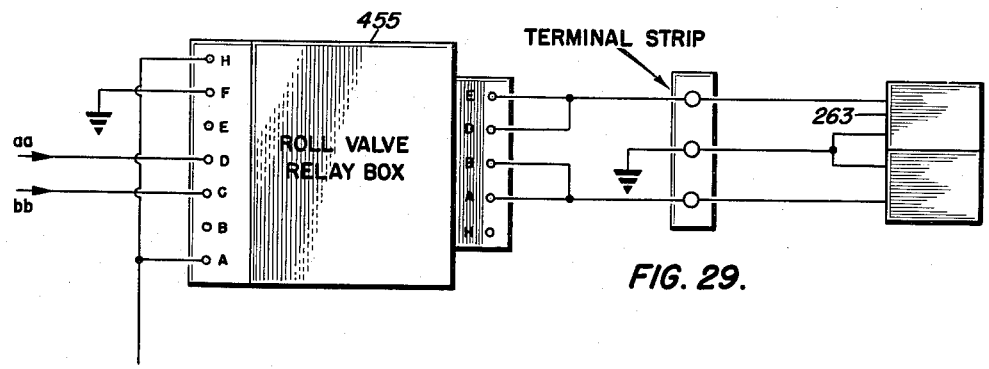
FIG. 29 is a continuation of the missile circuitry shown in FIG. 28 for the roll valve relay box.

In the roll plane, the free roll gyroscope 450, shown schematically in FIGS. 28, 29, and 36, provides a reference direction. The yaw and pitch gyroscopes 451 and 452, respectively, and shown schematically in FIGS. 28, 30, 31, and 35, will operate in a manner similar to that explained for the roll gyroscope. When the missile 60 deviates from the desired direction, a pick-off contact 453 on relay 454, in the roll valve relay box 455 in FIG. 34, is closed. This contact 453, in turn, actuates the magnetic actuator or solenoid 263, which reverses the gas jet issuing from the spaced ports for the roll control valve arrangement 113, as previously described. The torque force produced by the roll jet is in such a direction as to eliminate the initial deviation from the reference direction.

A contact 576, shown in FIG. 36, is rigidly mounted on the gyro frame, while a contact arm 578, engageable with the contact 576, is mounted on the gimbal of the roll gyroscope 450. It should be understood that the contact 578 is adjustable with respect to the contact 576, and that movement of contact 578 may be controlled by a coded signal from the radio receiver 470. Since radio signals are commonly used for remote control purposes, it is considered unnecessary to describe the contact control in detail.

The deviation from the reference direction previously mentioned will alternately open and close contact 576 and arm 578, and, in turn, will operate the relay 454 in the roll valve relay box 455. Thus actuator 263 is electrically connected to contacts 576 and 578 through the relay 454. The end result is that the missile 60 hunts about a mean direction with a small amplitude of approximately one degree with a frequency of the order of five (5) cycles per second.

Figure 30:
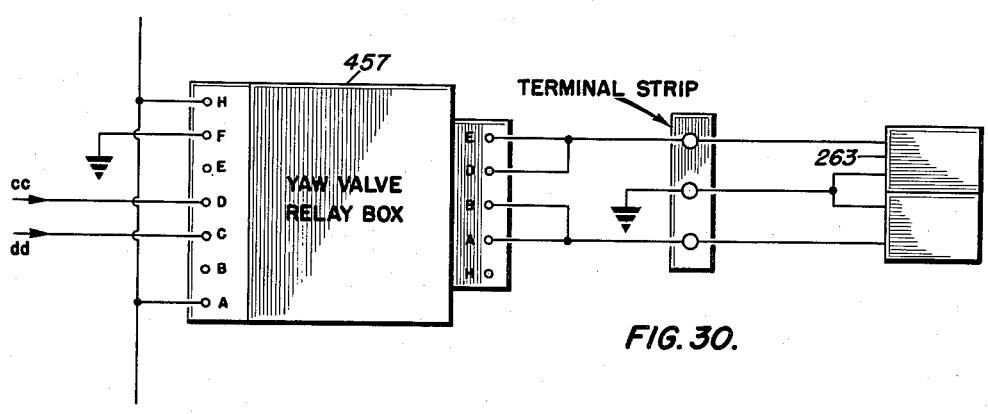
FIG. 30 is a continuation of the missile circuitry shown in FIG. 28 for the yaw valve relay box.
Figure 31:
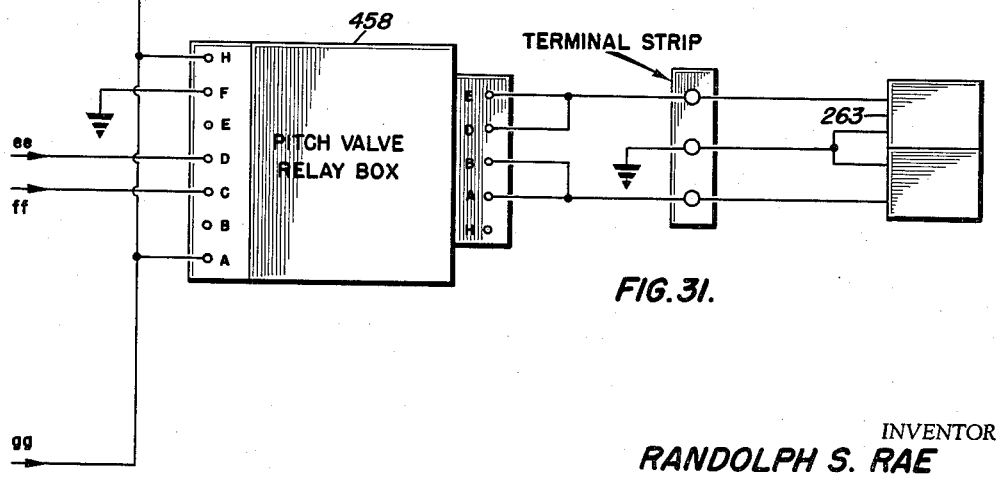
FIG. 31 is a continuation of the missile circuitry shown in FIG. 28 for the pitch valve relay box.

The magnetic actuator or solenoid 263 are the same for each control valve 111, 112, and 113, and are shown thus in FIGS. 30 and 31. The yaw and pitch valve relay boxes 457 and 458 are exactly the same as the roll valve relay box, only one of which is shown in FIG. 34.

Due to the fact that asymmetries occur in the jet thrust from the three control valve arrangements 111, 112, and 113, the alignment of the jet issuing from the main lifting and propulsion nozzle 110, and relay delay times, this simple hunt system does not maintain an accurate mean jet direction and a small drift of the missile 60 can occur. This drift of the missile 60 is overcome by providing a pair of slip ring contacts 459 and 460, with brushes 461 and 462, or 461A and 462A, called override or guidance contacts as shown in FIGS. 35 and 36, respectively. These contacts 461 and 462 have an angular spacing of approximately twice the hunting amplitude, and when the angular drift of the missile 60 causes one of these contacts 461 or 462 to be actuated, the normal hunting cycle is modified in such a way that the drift of the missile 60 is reduced or eliminated. The end result is that the missile 60 is restrained to hunt within a small angular sector of the order of approximately two (2) degrees which is defined by the override contacts 461 or 462. If the override contacts 461 or 462 are made movable with respect to the gyroscope reference direction, then the mean direction of the jet issuing from the appropriate control valve arrangement 111, 112, or 113, can be controlled.

In the system adapted in the missile 60, the override or guidance contacts 461 or 462 are moved clockwise or counter-clockwise by means of a small D.C. control motor 463 mounted in the yaw or pitch gyroscopes 451 and 452, respectively, and controlled by radio command signals from the transmitter 414 and the operator 400, which will be discussed more subsequently. The movement is controlled on a time basis, that is, the motor 463 runs at a fixed speed of 10 degrees per second and the angular signal transmitted is directly proportional to the signal transmission time.

In addition to the fact that the autopilot system is duplicating in roll, pitch, and yaw, it is to be noted that the yaw and pitch gyroscopes 451 and 452, respectively, shown schematically in FIG. 35 are modified to accept guidance signals and the roll autopilot system has stationary override contacts 461A and 462A, as shown in FIG. 36.

Figures 2A, 2B:
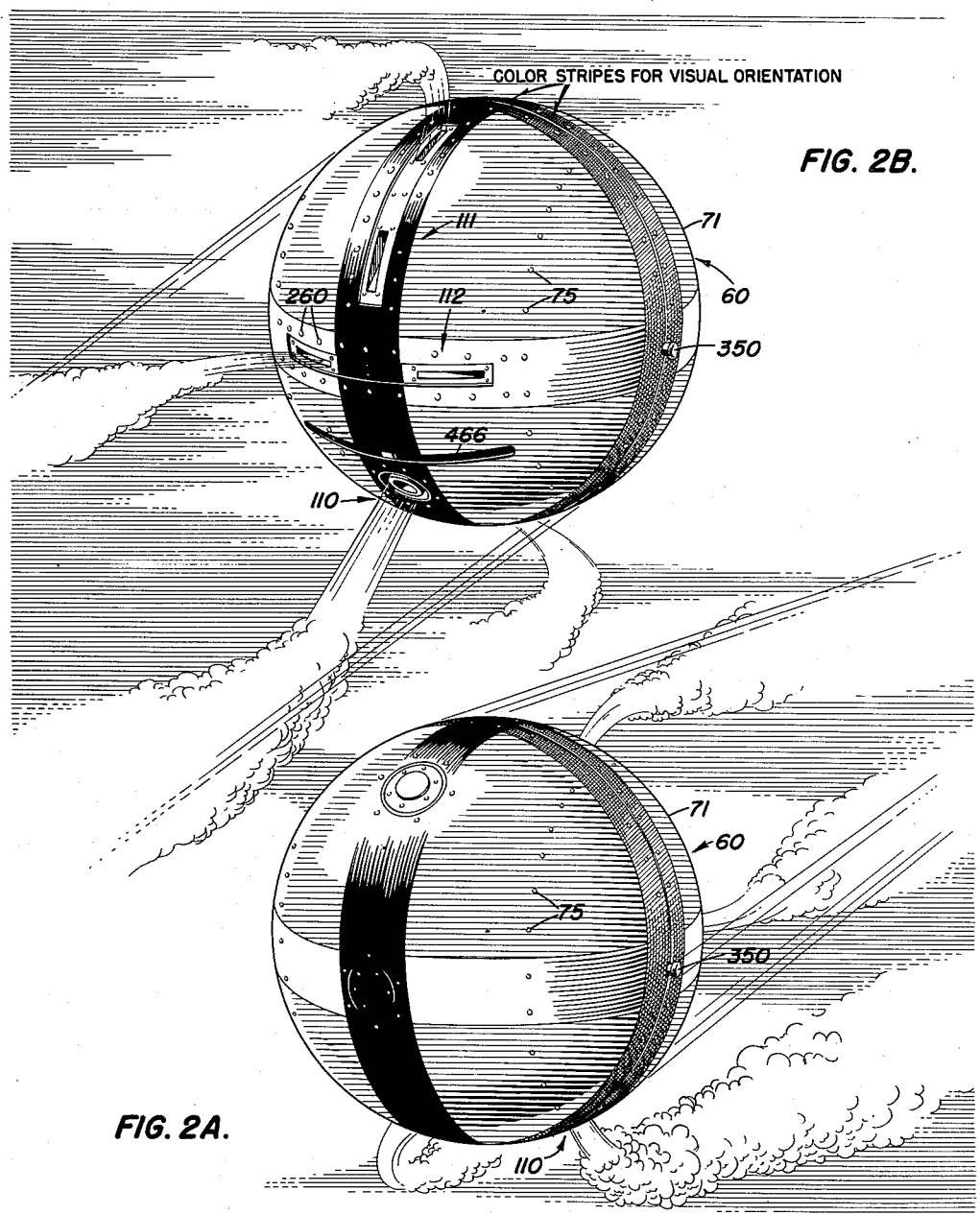
FIG. 2A is a three-quarter front perspective view of the missile.
FIG. 2B is a three-quarter rear perspective view of the missile.

The radio link with the missile 60 is similar to that used in guided bombs. The guidance signals from transmitter 414 consist of four audio tones, which frequency modulate a 220 megacycle R.F. carrier. Iin the missile 60, the carrier frequency is picked up by a half wave slot antenna 466 shown in FIGS. 2B and 27D, and is fed to the miniature F.M. receiver 470, which has automatic frequency control to compensate for any frequency drift in the R.F. carrier. At the entrance of the wave slot 466A, there is provided an antenna tuner 467 to vary the capacity across the slot by changing the thickness of insulating spacers 468A and 468B provided between the skin 71 and the aluminum member 469.

The demodulated signal is passed through the selective parallel T filter sections 474 which separate the audio tones and cause the proper relay 472 or 473, shown in the yaw or pitch control relay boxes 475 or 476 illustrated in FIG. 32, respectively, to throw whenever its associated audio tone is present. The relays 472 or 473, in turn, supplies power to the D.C. motor 463 controlling the position of the guidance contacts 461 and 462 on the yaw or pitch gyroscopes 451 or 452, respectively. The equipment is powered by the 30 volt battery supply 480 and the high voltage is obtained by the vibrator power supply 484.

On the ground, the guidance operator 400 puts in the desired signals by a control mechanism, such as a joystick which keys the audio oscillators in the transmitter 414. These, in turn, modulate the two (2) watt transmitter 414. The 220 megacycle is vertically polarized to provide maximum field strength along the ground. Frequency modulation is used because of its noise suppression characteristic and audio limiting properties.

As previously pointed out, if the missile 60 is properly controlled along its trajectory 408, then upon coming in the vicinity of or upon contact with the target, such as the tank 402, the fuze 83 will function to explode the warhead 32 to demolish or destroy the target 402.

Figure 39:
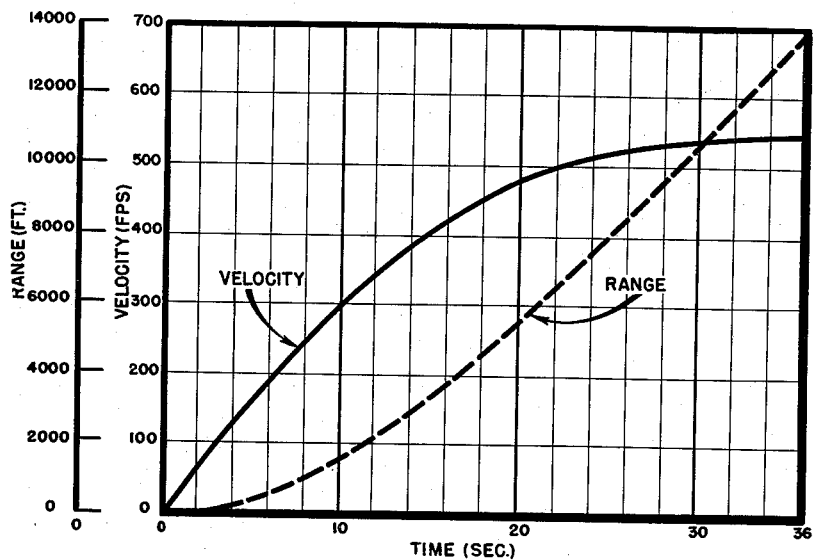
FIG. 39 is a graph of range and velocity versus time of flight of the missile showing curves of velocity and the range as a function of time.

In FIG. 39, there is shown the range and velocity of variation as a function of time for a 300 pound missile 60 in level flight at sea level, employing a programmed thrust to maintain a jet angle at 45°.

FIG. 40 illustrated curves of expected accuracy against range for various power telescopes under ideal conditions. It is evident that for higher accuracy in terminal guidance of a missile 60, a high magnification is required. This, however, implies a small field of view, and since it is desirable to have the missile 60 in view at all times, a restriction is imposed on the position of the launcher 315. This disadvantage can be offset by employing a telescope, such as 406, with variable magnification giving a wide field with low magnification initially, as previously described, and a lower field of view with high magnification at the end of the flight of the missile 60.

It is to be pointed out that a range of missile sizes is possible. By employing simple scaling rules, the performance of a range of missiles has been estimated. This information is presented in FIG. 41 which shows warhead weight plotted against missile weight for a number of missile ranges. The basic assumptions in the calculations for obtaining the curves illustrated in FIG. 41 are conservative, and the figures are representative of what can be achieved immediately without further research on materials and "miniaturization.'" The range at burnout of the propellant is indicated on each curve.

The parameters affecting the flight of the missile 60 will now be discussed.
Let:

$W$=Initial total weight of the missile, 300 pounds
$G$=Rocket fuel burning rate, pounds per second
$t$=Time
$F$=Total thrust of rocket, pounds
$F_x$=Horizontal component of F, pounds
$F_y$=Vertical component of F, pounds
$\alpha$=Angle between main jet and horizontal direction, that is, between F and horizontal direction, in degrees
$V$=Velocity, feet per second
$D$=Drag force, pounds
$\rho$=Density of air, slugs per cubic foot at seal level conditions
$R_N$=Reynolds number
$\mu$=Viscosity of air, pound foot second units
$g$=Acceleration of gravity, feet per sec.$^2$
$C_D$=Coefficient of drag
$C_T$=Coefficient of thrust of rocket, =⅔ (100) sec.
$d$=Diameter of sphere, 2 feet
$a$=Acceleration, feet per sec.$^2$
$m$=Instantaneous mass of the missile As a limitation, let there be considered only the case of zero climb of the missile 60, that is, level flight. For this condition the vertical component of thrust, $F_y$, must just balance the weight 63 of the missile 60, which is decreasing as the rocket grains 85 and 86 are consumed.

$$F_y = W - Gt \qquad \text{Eq. (1)}$$

Figure 42:
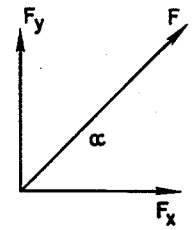
FIG. 42 is a thrust force diagram illustrating the angle α between the main lifting and propulsion jet and the x-axis as a function of time.

From FIG. 42, the angle $\alpha$ as a function of time is obtained.

$$\alpha = \sin^{-1}\frac{F_y}{F} \qquad \text{Eq. (2)}$$

The thrust of the rocket F, is directly proportional to the fuel burning rate, G.

$$F = C_t G \qquad \text{Eq. (3)}$$

And $\alpha$ can be defined as a function of the variables G and $t$, where W and $C_t$ are constants.

$$\alpha = \sin^{-1}\frac{W - Gt}{C_t \cdot G} \qquad \text{Eq. (4)}$$

From trigonometry, it is known then that $$F_x = F \cos \alpha \qquad \text{Eq. (5)}$$

On substituting the expression for $\alpha$ from Eq. 4 into Eq. 5, there is obtained:

$$F_x = C_t G \sqrt{1 - \left(\frac{W - Gt}{C_t \cdot G}\right)^2} \qquad \text{Eq. (6)}$$

Eq. 6 reduces to the following:

$$F_x = \sqrt{(C_t G)^2 - (W - Gt)^2} \qquad \text{Eq. (7)}$$

Figure 43:
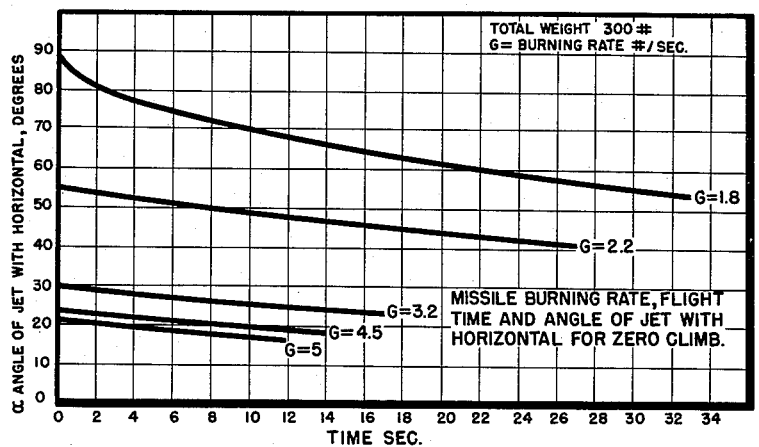
FIG. 43 is a graphical representation of the angle α referred in FIG. 42 as a function of time for several rocket fuel burning rates.
Figure 44:
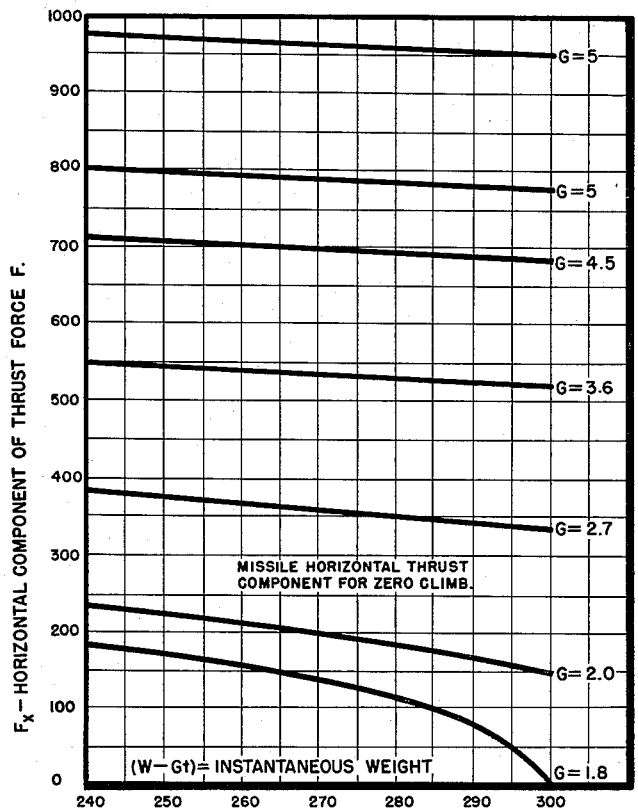
FIG. 44 is a graphical representation of the horizontal component of the total thrust of the rocket for several rocket fuel burning rates.

FIG. 43 is a plot of $\alpha$ as a function of time for several fuel burning rates, G, while FIG. 44 is a plot of $F_x$ for several burning rates.

In opposition to this force $F_x$, there are the aerodynamic drag, D, and the force resisting acceleration. The total thrust of the missile 60 is given by:

$$F = \frac{d(mv)}{dt} \qquad \text{Eq. (8)}$$

$$F = m\frac{dv}{dt} + v\frac{dm}{dt}$$

$$F_x = C_1 V^2 + \frac{W - Gt}{g}\frac{dv}{dt} - \frac{G}{g}V$$

Let $$F_{\bar{x}} = \text{constant}$$

$$\frac{g\,dt}{W - Gt} = \left(F_{\bar{x}} + \frac{G}{g}v - C_1 \cdot V^2\right)^{-1} \cdot dv$$

$q = 4ac - b^2$ $a = F_{\bar{x}}$ $b = \frac{G}{g}$ $c = -C_1$ $$-\frac{g}{G}\log(W - Gt) + C_4 = -\frac{2}{\sqrt{-q}} \tanh^{-1}\left(\frac{2Cv + b}{\sqrt{-q}}\right)$$

$$= -\frac{2}{\sqrt{4F_{\bar{x}}C_1 + \left(\frac{G}{g}\right)^2}} \tanh^{-1}\left[\frac{-2C_1 V + \frac{G}{g}}{\sqrt{4F_{\bar{x}}C_1 + \left(\frac{G}{g}\right)^2}}\right]$$

$v = 0, t = 0$ $$C_4 = \frac{g}{G}\log W - \frac{2}{\sqrt{4F_{\bar{x}}C_1 + \left(\frac{G}{g}\right)^2}}$$

$$\tanh^{-1}\left[\frac{\frac{G}{g}}{\sqrt{4F_{\bar{x}}C_1 + \left(\frac{G}{g}\right)^2}}\right]$$

$$\frac{g}{G}\log\left(\frac{W}{W - Gt}\right) = \frac{2}{\sqrt{4F_{\bar{x}}C_1 + \left(\frac{G}{g}\right)^2}}$$

$$\left\{\tanh^{-1}\frac{\frac{G}{g}}{\sqrt{4C_1 F_{\bar{x}} + \left(\frac{G}{g}\right)^2}} - \tanh^{-1}\frac{-2C_1 V + \frac{G}{g}}{\sqrt{4F_{\bar{x}}C_1 + \left(\frac{G}{g}\right)^2}}\right\}$$

$$-2C_1 V + \frac{G}{g} = \sqrt{4F_{\bar{x}}C_1 + \left(\frac{G}{g}\right)^2} \tanh$$

$$\left[\tanh^{-1}\frac{\frac{G}{g}}{\sqrt{4F_{\bar{x}}C_1 + \left(\frac{G}{g}\right)^2}} - \log\frac{W}{W - G \cdot t}\right]$$

$$\left(\frac{g}{2G}\sqrt{4F_{\bar{x}}C_1 + \left(\frac{G}{g}\right)^2}\right)\right]$$

and the terminal velocity error is of the order of 5.6% by neglecting the term:

$$\left(-\frac{G}{g}V\right)$$

Neglecting this term gives closer agreement with the numerical solution, and consequently, Eq. 8 is used as the proper equation for the assigned conditions.
As an approximation let $$F_x = D + ma \qquad \text{Eq. (9)}$$

where by definition there is obtained $$D = C_D \frac{\rho}{2} A V^2 \qquad \text{Eq. (10)}$$

$$a = \frac{dv}{dt} \qquad \text{Eq. (11)}$$

$$m = \frac{W - Gt}{g} \qquad \text{Eq. (12)}$$

For a missile 60 in the form of a sphere two feet in diameter, the Reynolds number is below the critical value, at which the air flow changes to a turbulent flow, as long as the velocity is less than about 630 f.p.s. Under this condition, the value of $C_D$ is very close to constant and it is valid to use $0.5 = C_D$. For the sea level condition, $$D = 0.5 \cdot \frac{.002378}{2} \cdot \frac{\pi 2^2}{4} \cdot V^2 \qquad \text{Eq. (13)}$$

$$D = 0.00186767 V^2 \qquad \text{Eq. (14)}$$

Let $$C_1 = 0.00186767 \qquad \text{Eq. (15)}$$

From the above, there is obtained $$F_x = C_1 V^2 + \left(\frac{W - Gt}{g}\right)\frac{dv}{dt} \qquad \text{Eq. (16)}$$

$$\sqrt{(C_t G)^2 - (W - Gt)^2} = C_1 V^2 + \left(\frac{W - Gt}{g}\right)\frac{dv}{dt} \qquad \text{Eq. (17)}$$

It is apparent that Equation 17 is difficult to integrate. However, an inspection of the variation of $F_x$ during the rocket life indicates that for values of G greater than about 2.0, the average value of $F_x$ can be used so that $F_x \neq f(t)$.

The variables of Eq. 16 can be separated because $F_{\bar{x}}$ is the average $F_x$ during the rocket life.

$$\frac{dv}{F_{\bar{x}} - C_1 V^2} = \left(\frac{g}{W - Gt}\right) dt \qquad \text{Eq. (18)}$$

Integrating both sides of (18)

$$\frac{1}{C_1}\sqrt{\frac{C_1}{F_{\bar{x}}}} \tanh^{-1} V\sqrt{\frac{C_1}{F_{\bar{x}}}} = -\frac{g}{G}\log(W - Gt) + C_4 \qquad \text{Eq. (19)}$$

When $t=0$, $V=0$ $$C_4 = \frac{g}{G}\log W \qquad \text{Eq. (20)}$$

$$\sqrt{\frac{1}{C_1 F_{\bar{x}}}} \tanh^{-1} V\sqrt{\frac{C_1}{F_{\bar{x}}}} = \frac{g}{G}\log\left(\frac{W}{W - Gt}\right) \qquad \text{Eq. (21)}$$

$$\tanh^{-1} V\sqrt{\frac{C_1}{F_{\bar{x}}}} = \sqrt{C_1 F_{\bar{x}}}\left(\frac{g}{G}\right)\log\left(\frac{W}{W - Gt}\right) \qquad \text{Eq. (22)}$$

$$V = \sqrt{\frac{F_{\bar{x}}}{C_1}} \tanh\left[\sqrt{C_1 F_{\bar{x}}}\left(\frac{g}{G}\right)\log\left(\frac{W}{W - Gt}\right)\right] \qquad \text{Eq. (23)}$$

Figure 47:
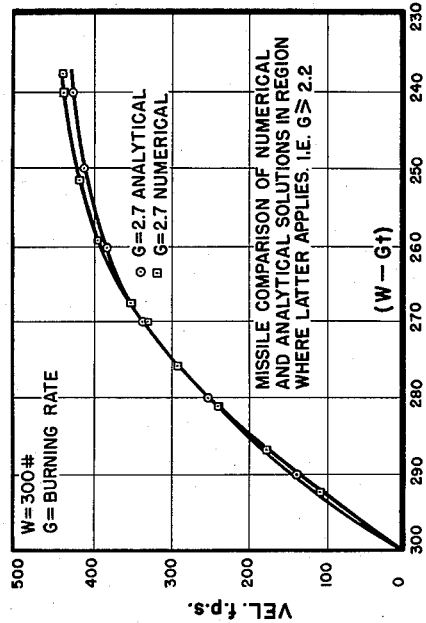
FIG. 47 is a graphical representation of velocity of missile as a function of the weight of the missile and the rocket fuel burning rate for a rocket fuel burning rate equal to or greater than 2.2.

From this equation, the velocity-time plots are easily obtained for different burning rates and different total fuel weights. This data is presented in FIG. 45. Through use of a planimeter it is easy to integrate these velocity plots of FIG. 45, and obtain the range of the missile 60 at various time intervals. This data is plotted in FIG. 46. As a check of this analytical solution, a numerical solution was accomplished for $G = 2.7$. FIG. 47 is a composite plot of the two solutions for velocity.

Figure 45:
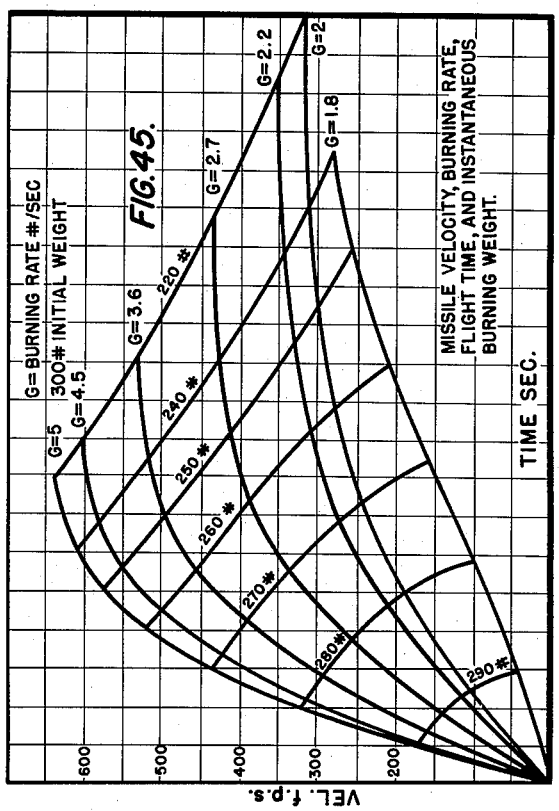
FIG. 45 is a graphical representation of velocity-time curves for different rocket fuel burning rates and different total fuel weights.
Figure 46:
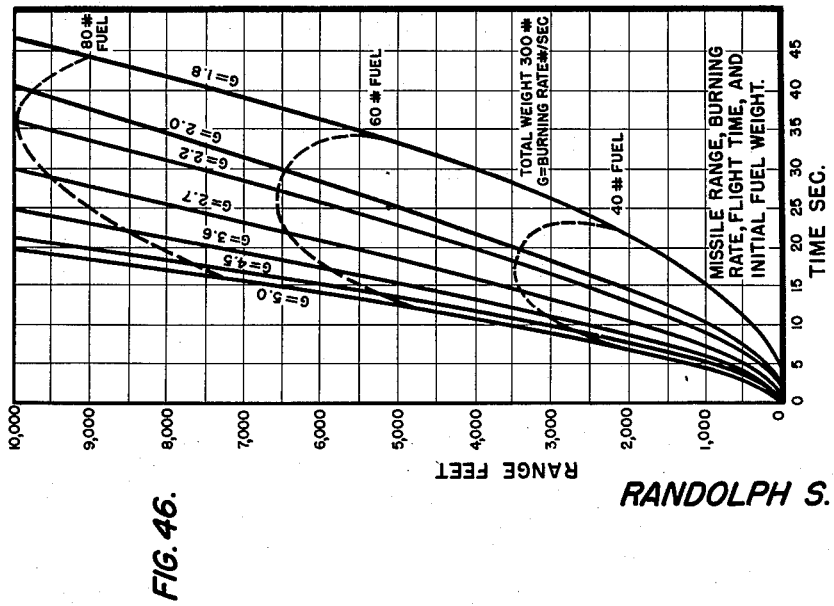
FIG. 46 is a graphical representation of the range of the missile as a function of time for different rocket fuel burning rates.

FIGS. 45 and 46 provide the flight data for this missile 60, and a basis for selecting an optimum fuel burning rate and fuel weight. In selecting a fuel burning rate, it is necessary to consider: desired range, a maximum flight time to reduce the evasive capacity of the target, a minimum flight time in the immediate area of the launching to impede identification of the launching site, a low terminal velocity of the missile 60 to facilitate control, a high average velocity to preclude ground fire interception, and a large enough thrust to enable use of the main jet for climbing and directional control.

A missile range of the order of say 6,000 feet requires an initial fuel weight of sixty pounds. The burning rates then reasonable, on a basis of the above considerations, are between 2.0 and 3.6 pounds per second. The terminal velocity can then be between 317 and 532 feet per second, while after five seconds of flight the missile will be between two and seven hundred feet from the launching site traveling at between one and three hundred feet per second depending on the selected burning rate. A burning rate of about three pounds per second is desirable under these conditions.

With respect to the controllability of the missile 60, let is be assumed that the tolerable deviation of the missile 60 from the line-of-sight 408 is plus or minus two feet. In order to make calculations simpler, assume that the excursions of the missile are of a sinusoidal nature. Further, let it be assumed that if the frequency of these deviations is at least one cycle, in four seconds, the operator 400 of the missile 60 can control them. Then, there is obtained, fairly easily, a value for the maximum permissible acceleration or deviation of the lifting forces acting on the missile 60 at any point of the trajectory. The forward velocity, of the missile, of course, is not considered in this calculation.

The maximum acceleration of the missile 60 is given by $$a = \frac{4\pi^2 b}{c^2} \qquad \text{Eq. (24)}$$

where $b$ is the amplitude of the deviation of the missile 60 from the line-of-sight 408, and $c$ is the period of the oscillation. Putting values in Eq. 24, there is obtained for the maximum acceleration $$a = \frac{4 \cdot 9.87 \cdot 2}{16} = 4.94 \approx 5 \text{ ft./sec.}^2$$

The maximum positive or negative force (F) above the one needed to overcome gravity in the case under consideration would, therefore, be $$\frac{F}{m} = a \qquad \text{Eq. (25)}$$

where $m$ is the mass of the missile 60. Inserting values in Eq. 25, there is obtained for the force.

$$F \approx 5.745 \approx 37 \text{ pounds}$$

when the mass is taken to be the one at the end of flight of the missile 60. Since the angle that the jet should have at any instance is known, the angular deviation of the jet permissible so as not to exceed this acceleration is known.

Let there be considered the case where the fuel is burned at the rate of 2.2 pounds per second. From FIG. 43 there is obtained the angles of the jet at any instance. The thrust of the jet is 366 pounds. From this, the maximum permissible angular deviations can be calculated. These are plotted in FIG. 48.

Figure 48:
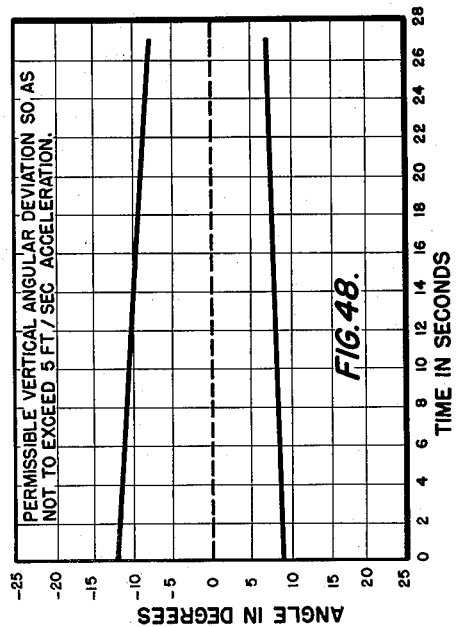
FIG. 48 is a graphical representation of the permissible vertical angular deviation of the missile so as not to exceed five (5) feet per second acceleration.

From the curves of FIG. 48, it is seen that the required accuracy of the jet controlling mechanism is of the order of degrees. Conversely, the maximum controlling forces that the operator 400 applies to the missile 60 should not exceed these values and the maximum angular correction that the mechanism should permit the operator to apply at any time should be the same as those shown in FIG. 48.

Figure 49:
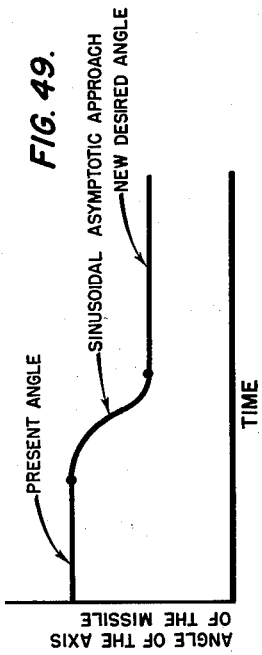
FIG. 49 is a graphical representation illustrating the angle of the axis of the missile as a function of time.

With the above information, it can now be determined how long it will take for the missile 60 to turn to the new angles. If these times are a fraction of the period of oscillation, the missile is controllable. To calculate this, several assumptions are in order: (1) that the whole jet is tilted to a maximum of ten degrees to furnish the rotational forces; (2) that the tilting of the jet is programmed in such a fashion so as to arrive at the new desired angle of the axis is an asymptotic sinusoidal manner as is shown in FIG. 49; (3) that the time for tilting the jet relative to the axis of the missile is small compared to the periods that are to be calculated; and (4) that the time for tilting the jet relative to the axis of the missile is small compared to the periods that are to be calculated.

means for each pair of spaced ports for discharging other portions of said pressurized fluid as tangentially directed jets through either port of each of said pair of spaced ports alternately to cause said missile to rotate about at least one of its principal axes, and a corresponding number of automatic pilot systems, one each operatively associated with each of said last-mentioned discharging means for controlling the latter discharging means, whereby the orientation of said missile is stabilized and said missile is caused to maintain a constant heading.

2. In a controlled missile having structure including a spherical body having three principal axes, said structure having a pair of tangentially directed, spaced ports positioned in each plane containing one of the principal axes of revolution of said body, means for generating fluid under pressure in said body, means on said body for communicating with said source of pressurized fluid and for discharging a portion thereof as a radially directed jet in such a manner to lift and propel said missile, means for each pair of spaced ports for discharging other portions of said pressurized fluid as tangentially directed jets through either port of each of said pair of spaced ports alternately to cause said missile to rotate about at least one of its principal axes, a corresponding number of automatic pilot systems, one each operatively associated with each of said last-mentioned discharging means for controlling the latter discharging means, whereby the orientation of said missile is stabilized and said missile is caused to maintain a constant heading, and guidance means electronically associated with said automatic pilot systems for eliminating any angular drift of said missile due to asymmetries in the structure of said missile and for directing said missile along a trajectory.

3. In a controlled missile having structure including a spherical body having three principal axes, said structure having a pair of tangentially directed, spaced ports located in each plane containing one of the principal axes of revolution of said body, means for generating fluid under pressure in said body, means on said body arranged to communicate with said source of fluid under pressure and to discharge a portion thereof as a radially directed jet in such a manner as to lift and propel said missile, means for each pair of spaced ports and each including a butterfly valve pivotally mounted between its corresponding pair of spaced ports to alternately open and close its respective pair of spaced ports, and automatic pilot means corresponding in number to said number of pairs of spaced ports and each including a motor and a linkage between said motor and said butterfly valve for shifting said butterfly valve from a position directing fluid flow from said source of fluid under pressure through one of each pair of spaced ports to a position directing fluid flow through the other of each pair of spaced ports, whereby the orientation of said missile is stabilized and said missile is caused to maintain a constant heading.

4. In a controlled missile having structure including a spherical body having three principal axes, said structure having a pair of tangentially directed, spaced ports located in each plane containing one of the principal axes of revolution of said body, means for generating fluid under pressure in said body, means on said body for communicating with said source of fluid under pressure and for discharging a portion thereof as a radially directed jet in such a manner as to lift and propel said missile, means for each pair of spaced ports and each including a butterfly valve pivotally mounted between its corresponding pair of spaced ports to alternately open and close its respective pair of spaced ports, automatic pilot means corresponding in number to said number of pairs of spaced ports and each including a motor and a linkage between said motor and said butterfly valve for shifting said butterfly valve from a position directing fluid flow from said source of fluid under pressure through one of each pair of spaced ports to a position directing fluid flow through the other of each pair of spaced ports, whereby the orientation of said missile is stabilized and said missile is caused to maintain a constant heading, and guidance means electronically associated with said automatic pilot means for eliminating any angular drift of said missile due to asymmetries in the structure of said missile and for directing said missile along a predetermined trajectory.

5. A missile having a spherical body means for generating a source of fluid under pressure in said body, means on said body arranged for discharging a portion of said pressurized fluid as a radially directed jet for developing a thrust force for propelling said missile, the principal direction of said thrust force passing substantially through the center of gravity of said missile, means for discharging other portions of said pressurized fluid at the surface periphery of said missile as tangentially directed jets for developing torque forces in the principal planes of said missile so as to cause said missile to shift about the principal axes contained in said planes, whereby the orientation of said missile is stabilized and said missile maintains a constant heading in the absence of guidance signals, and means associated with said last-mentioned discharging means for guiding said missile along a trajectory.

6. In a missile, a spherical outer skin, a rocket motor in the missile and having a rocket chamber, a nozzle communicating between the rocket chamber and the outer surface of the skin and arranged to exhaust gases radially of the missile, a warhead in the missile, spaced ports carried by the missile and communicating with the outer surface of the skin, means connecting the spaced ports with the rocket chamber, a relatively large portion of gases produced by the rocket motor after ignition thereof being ejected radially of the missile through said nozzle and a relatively small portion of such gases being ejected by said ports through said connecting means, means for ejecting the relatively small portion of the gases tangentially of said missile through said ports, and means for cooling gases ejected by said ports, said cooling means comprising water bags mounted in the missile adjacent the rocket chamber, said water bags being compressible by gases from said chamber, nozzles connected with the ports, and means connecting the nozzles with the water bags.

7. A missile as recited in claim 6, including additionally gyroscopes carried within the missile between the skin and the rocket chamber for stabilizing the missile during propulsion thereof.

References Cited in the file of this patent

UNITED STATES PATENTS

| | | |
|---|---|---|
| 37,940 | Plant | Mar. 17, 1863 |
| 291,054 | Harwood | Jan. 1, 1884 |
| 514,527 | Wauters | Feb. 13, 1894 |
| 1,501,886 | Abbot | July 15, 1924 |
| 1,838,354 | Bauer | Dec. 29, 1931 |
| 1,879,187 | Goddard | Sept. 27, 1932 |
| 2,339,011 | Gurney | Jan. 11, 1944 |
| 2,413,621 | Hammond | Dec. 31, 1946 |
| 2,503,271 | Hickman | Apr. 11, 1950 |
| 2,584,127 | Harcum | Feb. 5, 1952 |
| 2,696,079 | Kappus | Dec. 7, 1954 |
| 2,726,510 | Goddard | Dec. 13, 1955 |
| 2,822,755 | Edwards et al. | Feb. 11, 1958 |

FOREIGN PATENTS

| | | |
|---|---|---|
| 300,098 | Germany | Sept. 23, 1920 |
| 879,835 | France | Dec. 10, 1942 |

Figure 50:
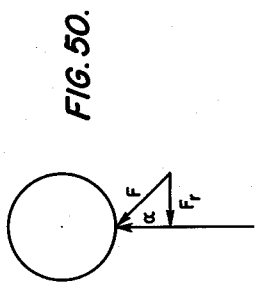
FIG. 50 is a schematic of the missile illustrating the rotational and main propulsion forces acting on the missile.

From FIG. 50, it is seen that if the jet is tilted by ten degrees, the maximum rotational force $F_r$ will be $$F_r = F \sin a \qquad \text{Eq. (26)}$$

Inserting values into Eq. 26, the rotational force is:

$$F_r = 366 \cdot 0.17365 \approx 63 \text{ pounds}$$

Figure 51:
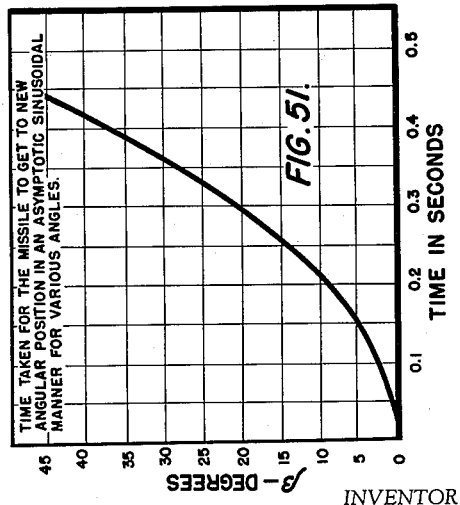
FIG. 51 is a graphical representation of a curve illustrating the time taken for the missile to arrive at a new angular position in an asymptotic sinusoidal manner for various angles.

Knowing the rotational force, the inertia of the missile 60, and that it is desired to obtain the new angle in a sinusoidal asymptotic approach fashion, the time to get to the new angles can be easily calculated. The results of these calculations are shown in FIG. 51.

As it has previously been seen, the order of the maximum variation of angles required is of the order of twenty degrees, so that with the values taken and assumptions made, the time for the missile 60 to get to the new position is less than three-tenths of a second. This is but a fraction of the period which has been considered previously. This means that the missile 60 is easily controlled.

If an unskilled operator suddenly realizes that the missile 60 is deviating at the fastest permissible rate as defined by the accepted minimum period of four seconds per cycle, and that he appreciates this only by the time the missile is at the center of the target (crossing at the highest rate), what is the maximum excursion of the missile 60 from the center line if the operator applies full correction as soon as he is capable of doing so. The following sequence of events occur: (1) the operator realizes that the target is crossing the center line at a high rate; (2) the operator applies the maximum correction. This takes the operator one-tenth of a second; (3) the missile 60 takes three-tenths of a second to orient itself to the new position of the jet giving maximum acceleration of five feet per second in the opposite direction; and (4) the acceleration of the missile 60 in the opposite direction starts. The simplification is made that while the missile 60 is rotating to its new angular position, no acceleration is apparent.

Figure 52:
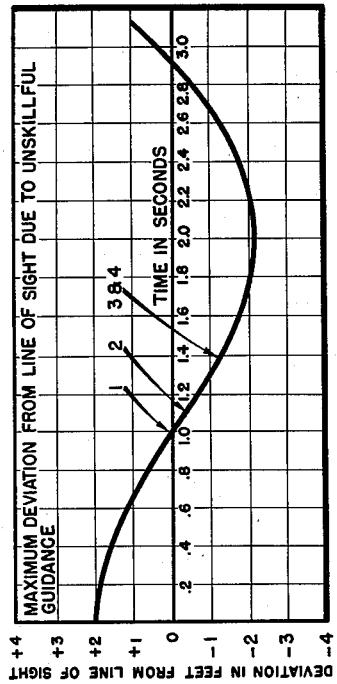
FIG. 52 is a graphical representation of a curve illustrating the maximum deviation of the missile from the line-of-sight due to an unskillful operator.

This sequence of events is depicted graphically in FIG. 52, from which it can be seen that the maximum deviation of the missile 60 is little over two feet in this extreme case.

It is further seen that the crossing angle with the center line is greater than in the first case, which means that if the operator repeats the procedure he will perform a series of oscillations with expanding amplitudes.

The maximum restraining force due to the damping effect of the jet of the missile 60 when the attitude of the missile is being changed, can be easily calculated. A change of twenty degrees is the maximum change involved based on the chosen conditions. It is known that to change from one position to the new position requires three-tenths of a second, and that this is done in a sinusoidal asymptotic fashion. The maximum peripheral velocity ($V_p$) can now be calculated easily. The maximum damping force ($F_D$) will then be $$F_D = dV_p \qquad \text{Eq. (27)}$$

where $d$ is the mass flow per unit time of the jet.

Inserting values, there is obtained:

$$F_D = 0.068 \quad 1.94 = 0.132 \text{ pound}$$

This is a small value compared to the controlling jet force which is of the order of many pounds.

An important problem for the tactical use of this missile 60 is the determination of the flexibility permitted in the initial positioning of the missile 60 wth respect to the operator 400, and the initial orientation of the missile 60 with respect to the line-of-sight 408 between the operator 400 and the target 402. These two items are interrelated, and because the data available are limited, it is possible to give only an approximate indication of the general trends. The indications are that, if the missile 60 is fired from behind the operator 400, and is not visible until after two or three seconds (or approximately 100 feet of flight), it will be necessary to align the missile 60 rather accurately before firing. For example, a deviation of more than five degrees between initial setting and line-of-sight 408 is likely to provide too difficult a capture situation. If, on the other hand, the missile 60 is launched forward of the operator 400 and is visible from the instant of firing, this angle can perhaps be of the order 15 degrees.

It is believed that the missile 60 should not be launched further than 100 feet from behind the operator 400 and not displaced from the line-of-sight more than perhaps 25 feet. If launched forward of the operator 400, these figures may perhaps be multiplied by three. These estimates apply when the target is at 3000 yards and must be proportionately reduced for shorter ranges.

For a fixed predetermined target these limitations present no problem, but for a target of opportunity 402 it will be necessary, if a wide field of fire is required to reorient the launcher 315 rapidly before firing. This could conceivably be done by a member of the firing crew on instruction from the operator 400, who, with his binoculars 406 on the target 402, transmits the required bearing verbally. The relatively low lateral acceleration available in this missile 60 represents a minimum limitation only when the missile and operator are close together (less than ten feet apart). Under these conditions, the missile orientation might be determined by a direct link between the operator's sight and the launcher 315. This might be readily achieved if the missile 60 were launched from a vehicle with the operator in the driver's cab.

There has been considerable speculation on the feasibility of launching the missile 60 from a position well to the rear of the operator 400 and guiding it onto the target 402 from his forward position. Experience indicates that this can only be done when the rear operator, forward operator, and target are approximately on the same line. This limitation arises because of the relatively low lateral acceleration of this missile 60.

It has been demonstrated during successful firings of the missile 60 that it is possible to launch the missile 60 from a concealed position. This is achieved during the launching phase by means of an automatic internal program which causes the missile to rotate in the pitch plane and describe an upward trajectory before leveling off and coming under the control of the operator 400. This capability of the spherical missile 60 is advantageous, since it affords the possibility of complete concealment from direct enemy fire. Even the operator 400 can avoid exposure by employing a periscope for guiding the missile 60.

Missiles 60 can be launched from trucks. A three-quarter-ton truck carrying two missiles 60 and a two-ton truck carrying four missiles 60 have been employed. No difficulties have been experienced, and this procedure has proved both convenient and practical. While in transit, the missiles 60 are clamped in their individual launchers 315, and, in a field application, it would be necessary to remove only the traveling clamps to ready the missiles 60 for firing. It is believed that the missiles 60 could be arranged on the bed of the vehicle with only an inch or two of clearance between adjacent missiles.

Obviously many modifications and variations of the present invention are possible in the light of the above teachings. It is therefore to be understood that within the scope of the appended claims the invention may be practiced otherwise than as specifically described.

What is claimed is:

1. In a controlled missile having structure including a spherical body having three principal axes, said structure having a pair of, tangentially directed, spaced ports located in each plane containing one of the principal axes of revolution of said body, means for generating fluid under pressure in said body, means on said body arranged to communicate with said source of pressurized fluid and to discharge a portion thereof as a radially directed jet in such a manner to lift and propel said missile,